US010914110B2

(12) United States Patent
Mitchell

(10) Patent No.: US 10,914,110 B2
(45) Date of Patent: Feb. 9, 2021

(54) MULTIFUNCTION RADAR BASED DETECTION SYSTEM FOR A VEHICLE LIFTGATE

(71) Applicant: MAGNA CLOSURES INC., Newmarket (CA)

(72) Inventor: J. R. Scott Mitchell, Newmarket (CA)

(73) Assignee: MAGNA CLOSURES INC., Newmarket (CA)

( * ) Notice: Subject to any disclaimer, the term of this patent is extended or adjusted under 35 U.S.C. 154(b) by 162 days.

(21) Appl. No.: 16/172,915

(22) Filed: Oct. 29, 2018

(65) Prior Publication Data

US 2019/0128040 A1 May 2, 2019

Related U.S. Application Data

(60) Provisional application No. 62/580,506, filed on Nov. 2, 2017, provisional application No. 62/654,784, filed on Apr. 9, 2018.

(51) Int. Cl.
*E05F 15/40* (2015.01)
*E05F 15/73* (2015.01)
(Continued)

(52) U.S. Cl.
CPC ............ *E05F 15/40* (2015.01); *E05F 15/43* (2015.01); *E05F 15/73* (2015.01); *G01S 13/88* (2013.01);
(Continued)

(58) Field of Classification Search
CPC ... G01S 2013/9314; G01S 2013/93272; G01S 2013/93274; G01S 13/931; E05F 15/40;
(Continued)

(56) References Cited

U.S. PATENT DOCUMENTS

| 4,009,476 A | 2/1977 | Lutz |
| 5,845,000 A | 12/1998 | Breed et al. |

(Continued)

FOREIGN PATENT DOCUMENTS

| DE | 102013010994 A1 | 1/2015 |
| WO | 03004816 A1 | 1/2003 |
| WO | WO2016138238 A1 | 9/2016 |

OTHER PUBLICATIONS

S. Rao, "Introduction to mmwave Sensing: FMCW Radars", Texas Instruments (TI) mmWave Training Series, Apr. 2017, retrieved on-line at https://training.ti.com/sites/default/files/docs/mmwaveSensing-FMCW-offlineviewing_3.pdf.

*Primary Examiner* — Atul Trivedi
(74) *Attorney, Agent, or Firm* — Dickinson Wright PLLC

(57) ABSTRACT

A detection system and method of operating the detection system are provided. The system includes a power supply unit and at least one sensor for sensing at least one of an object and a motion. A communication unit is electrically coupled to the power supply unit for communicating with a plurality of vehicle system controllers. A microprocessor is operable in a plurality of modes and electrically coupled to the power supply unit and the at least one sensor and the communication unit. The microprocessor is configured to determine which of the plurality of modes should be active based on communication with the vehicle system controllers and to receive and process the data from the at least one sensor. The microprocessor is also configured to initiate movement of the closure panel in response to processing the data corresponding to the at least one of the object and the motion.

20 Claims, 32 Drawing Sheets

(51) Int. Cl.
  *G01S 13/88* (2006.01)
  *G01S 13/931* (2020.01)
  *E05F 15/43* (2015.01)

(52) U.S. Cl.
  CPC ......... *G01S 13/931* (2013.01); *E05Y 2400/54* (2013.01); *E05Y 2400/85* (2013.01); *E05Y 2800/00* (2013.01); *E05Y 2900/546* (2013.01); *G01S 2013/9314* (2013.01); *G01S 2013/93272* (2020.01); *G01S 2013/93274* (2020.01)

(58) Field of Classification Search
  CPC ...... E05F 15/43; E05F 15/73; E05Y 2400/54; E05Y 2400/85; E05Y 2900/546; E05Y 2800/00
  USPC .......................................................... 701/49
  See application file for complete search history.

(56) References Cited

U.S. PATENT DOCUMENTS

| | | | |
|---|---|---|---|
| 7,175,227 B2 | 2/2007 | Menard | |
| 7,660,437 B2 | 2/2010 | Breed | |
| 9,335,825 B2 | 5/2016 | Rautiainen et al. | |
| 9,689,982 B2 | 6/2017 | Herthan | |
| 10,308,167 B2 | 6/2019 | Caron | |
| 2005/0168010 A1 | 8/2005 | Cleland et al. | |
| 2012/0123649 A1* | 5/2012 | Eggers | E05F 15/77 701/49 |
| 2013/0099943 A1* | 4/2013 | Subramanya | B60Q 9/002 340/933 |
| 2014/0207344 A1* | 7/2014 | Ihlenburg | E05F 15/74 701/49 |
| 2016/0083995 A1* | 3/2016 | Dezorzi | G07C 9/28 340/5.72 |
| 2016/0107643 A1* | 4/2016 | Mizutani | G01S 13/931 701/519 |
| 2016/0208537 A1* | 7/2016 | Senguttuvan | E05F 15/73 |
| 2016/0252607 A1 | 9/2016 | Saboo et al. | |
| 2017/0028966 A1* | 2/2017 | Elie | B60K 28/12 |
| 2017/0030127 A1* | 2/2017 | Elie | E05F 15/77 |
| 2017/0030128 A1* | 2/2017 | Elie | G07C 5/0808 |
| 2017/0030135 A1* | 2/2017 | Elie | E05F 15/41 |
| 2017/0030737 A1* | 2/2017 | Elie | G01D 5/14 |
| 2017/0032599 A1* | 2/2017 | Elie | G06F 21/00 |
| 2017/0060254 A1 | 3/2017 | Molchanov et al. | |
| 2017/0080785 A1* | 3/2017 | Azarko | G06F 3/0416 |
| 2017/0247926 A1* | 8/2017 | Elie | E05F 15/73 |
| 2017/0267244 A1* | 9/2017 | Kim | B60W 30/18018 |
| 2017/0293025 A1 | 10/2017 | Davis et al. | |
| 2017/0306684 A1* | 10/2017 | Baruco | B60R 1/06 |
| 2017/0307728 A1 | 10/2017 | Eshraghi et al. | |
| 2017/0371060 A1* | 12/2017 | Nogueira-Nine | G01S 15/04 |
| 2018/0238099 A1* | 8/2018 | Schatz | E05F 15/40 |
| 2018/0288320 A1* | 10/2018 | Melick | G01S 17/86 |
| 2019/0101634 A1 | 4/2019 | Baheti et al. | |
| 2019/0309564 A1* | 10/2019 | Mitchell | E05B 81/70 |
| 2020/0018111 A1* | 1/2020 | Akbarian | G01S 13/931 |
| 2020/0024884 A1* | 1/2020 | Inskeep | E05F 15/73 |
| 2020/0157873 A1* | 5/2020 | Sabatini | B60R 25/00 |
| 2020/0284883 A1* | 9/2020 | Ferreira | G01S 7/4816 |

* cited by examiner

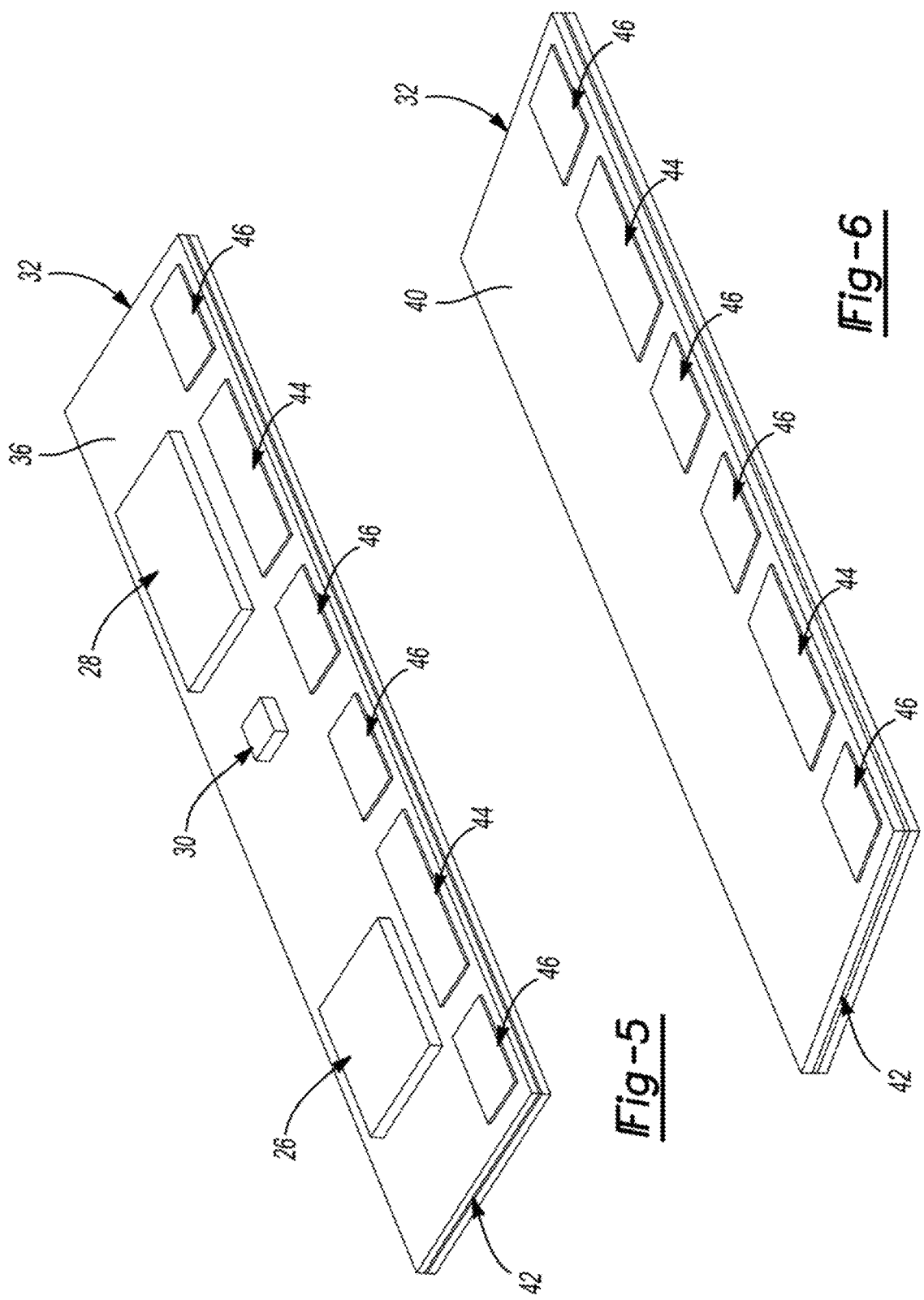

A Gesture Motion (Such as Foot Movement)
Can be Detected by CHMSL RADAR
to Operate a Power Liftgate RADAR Signature
of a Moving Foot
Located 1m Away
from Bumper

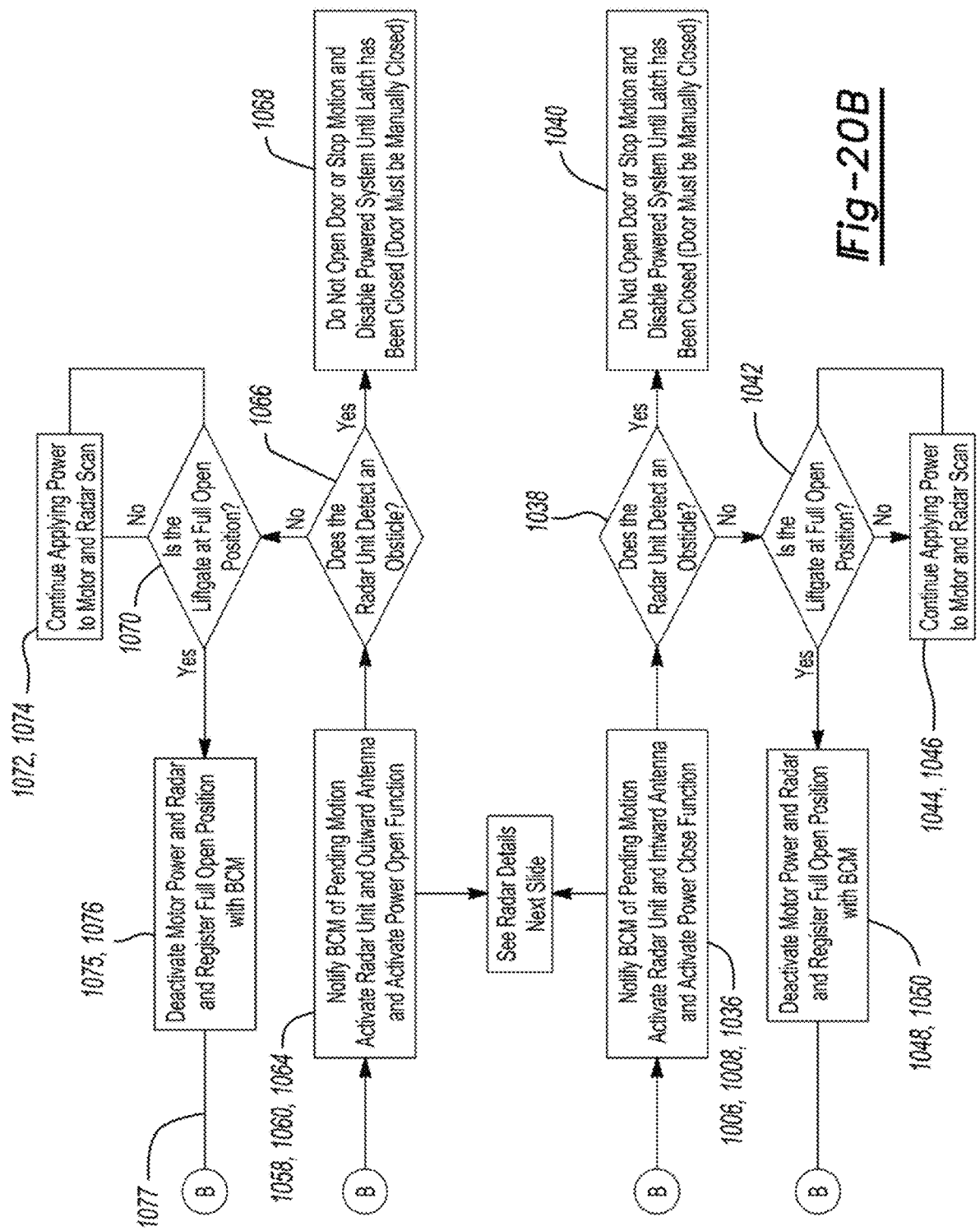

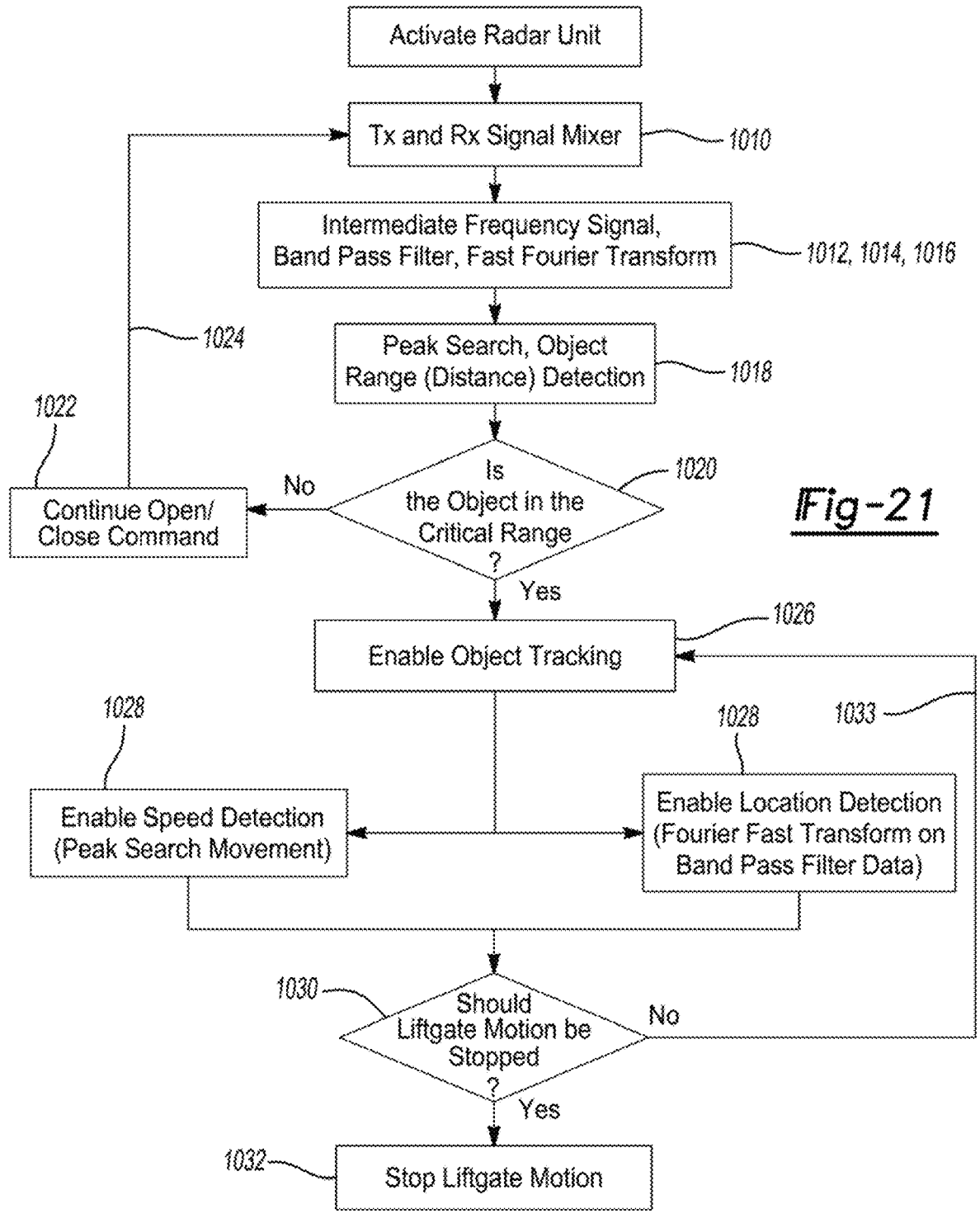

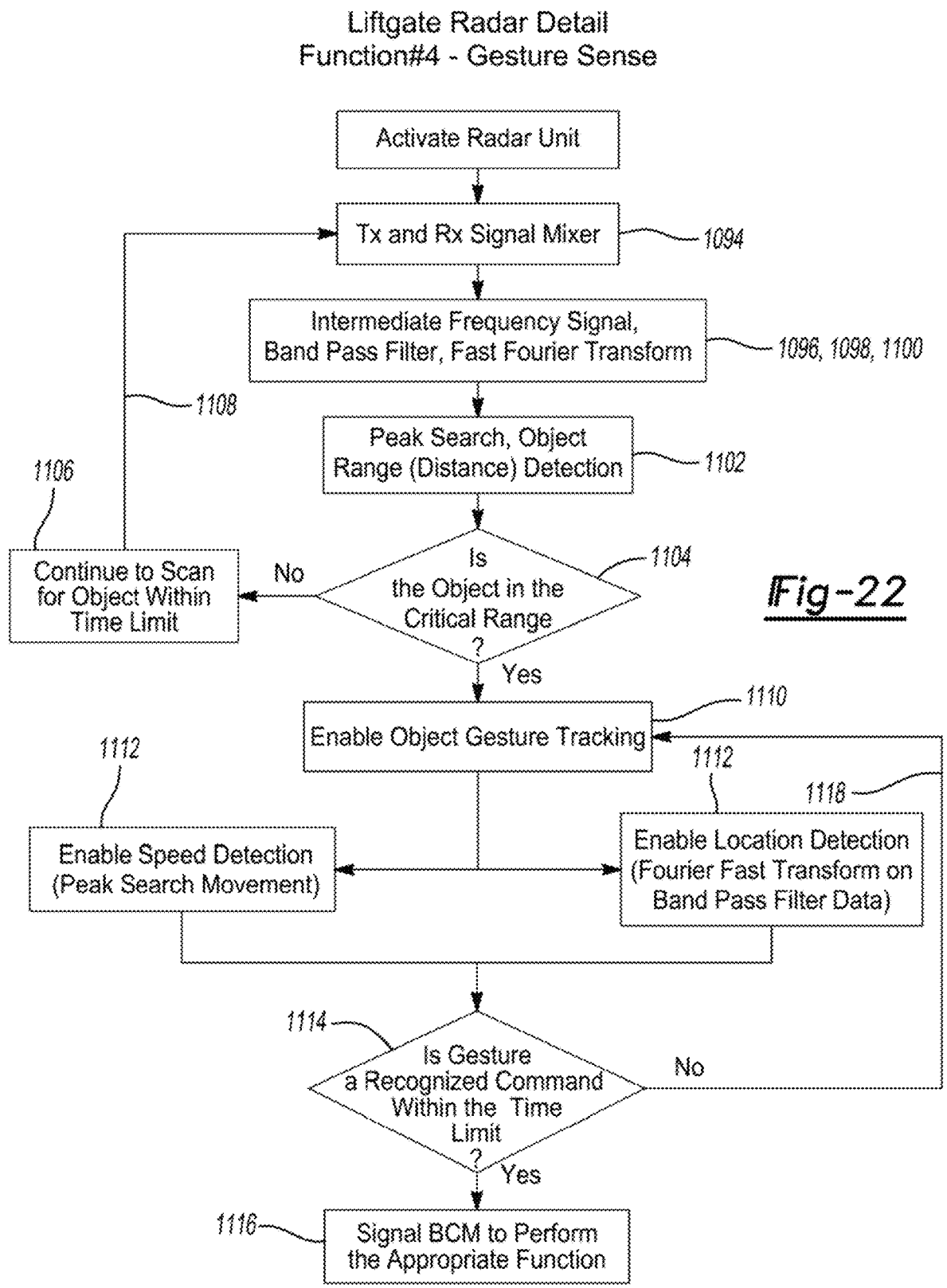

MULTIFUNCTION RADAR BASED DETECTION SYSTEM FOR A VEHICLE LIFTGATE

CROSS-REFERENCE TO RELATED APPLICATIONS

This utility application claims the benefit of U.S. Provisional Application No. 62/580,506 filed Nov. 2, 2017 and U.S. Provisional Application No. 62/654,784 filed Apr. 9, 2018. The entire disclosures of the above applications are incorporated herein by reference.

FIELD

The present disclosure relates generally to a detection system for motor vehicles and, more particularly to a multifunction radar based detection system for a vehicle closure panel. The present disclosure also relates to a method of operating the detection system.

BACKGROUND

This section provides background information related to the present disclosure which is not necessarily prior art.

Vehicles are now being equipped with various sensor systems that perform different functions. These functions may be related to gesture recognition for access control, reverse parking obstacle detection for notifying the driver of obstacles during reverse, and obstacle detection for detecting obstacles when the closure panel is being opened and closed.

For example, vehicles may be provided with a gesture activated system which can detect foot or hand movements for opening the closure panel (e.g., liftgate of the vehicle) based on the gesture made. Typically sensors of such a gesture activated system may be provided in the bumper and pointed towards the ground to detect foot gestures, because of range restrictions of the technology used (e.g., ultrasonic sensors). Also for example, vehicles may be provided with a park assist system with sensors generally directed outwards from the vehicle to detect objects when reversing the vehicle, such as parked cars, posts, people, etc., to which the driver is alerted to upon detection (e.g., most sport utility vehicles (SUVs) with liftgates use multiple ultrasonic sensors in the bumper for detection during reverse). Also, for example, the vehicle may include an obstacle detection system with sensors provided to sense an obstacle in the path of the closure panel opening, or for detecting an obstacle when the closure panel is closing. Thus, in such an obstacle detection system, the sensor beams would be required to be directed both outwardly (or away) from the exterior of the closure panel, and away from the interior of the closure panel.

Nevertheless, the gesture activated system, park assist system, and obstacle detection system are commonly distinct systems, and tailored for the specific function (i.e. designed for specific areas of coverage such as either the ground, the area in front of the closure panel, or an area facing inwardly from the closure panel.) Having multiple systems performing different functions requires sensors tailored for each specific application, have specific coverage zones, and require multiple position placement on a closure panel. Additionally, having multiple systems each designed for specific areas of coverage such as either the ground, the area in front of the closure panel, or an area facing inwardly from the closure panel still suffer the drawbacks of blindspot coverage zones, particularly when such systems are employed with a powered liftgate which can create sensor blindspots during movement of the powered liftgate.

When it relates specifically to powered liftgates, typically liftgates are not provided with object sensing capabilities in the opening direction since as the liftgate moves, the sensor coverage area changes relative to the movement of the liftgate due to the sensor being fixed to the liftgate. Also most SUVs with liftgates use a separate system of multiple ultrasonic sensors in the bumper for detection during reverse, which cannot detect obstacles in front of the liftgate at a high elevated position.

Accordingly, there remains a need for improved detection systems used on motor vehicles and methods of operation thereof that overcome these shortcomings.

SUMMARY

This section provides a general summary of the present disclosure and is not a comprehensive disclosure of its full scope or all of its features and advantages.

It is an object of the present disclosure to provide a detection system for use in a motor vehicle and a method of operating the detection system that address and overcome the above-noted shortcomings.

Accordingly, it is an aspect of the present disclosure to provide a detection system for a closure panel of a vehicle having at least one vehicle system controller. The detection system includes at least one sensor for sensing at least one of an object and a motion adjacent the closure panel and outputting data corresponding to at least one of an object and motion. The detection system additionally includes a microprocessor operable in a plurality of modes and electrically coupled to the at least one vehicle system controller and the at least one sensor. The microprocessor is configured to determine which of the plurality of modes should be active based on communication with the at least one vehicle system controller. The microprocessor is also configured to receive and process data corresponding to the at least one of the object and motion from the at least one sensor based on the determination of which of the plurality of modes should be active. In addition, the microprocessor is configured to initiate movement of the closure panel in response to processing the data corresponding to the at least one of the object and the motion.

According to another aspect of the disclosure, a method of operating a detection system in communication with at least one vehicle system controller of a vehicle is also provided. The method begins with the step of determining which of a plurality of modes of a microprocessor of the detection system should be active based on the microprocessor receiving at least one of a signal to open a closure panel of the vehicle and a signal to close the closure panel of the vehicle and a wake-up signal and a reverse-on signal from the at least one vehicle system controller in a stand-by state. The method continues by operating at least one sensor of the detection system to detect an object in an inward obstacle detection mode in response to receiving the signal to close the closure panel. The next step of the method is commanding closure of the closure panel based on the detection of the object in the inward obstacle detection mode. The method proceeds with the step of operating the at least one sensor of the detection system to detect the object in an outward obstacle detection mode in response to receiving the signal to open the closure panel. Next, commanding opening of the closure panel based on the detection of the object in the outward obstacle detection mode. The method also includes the step of operating the at least one sensor of the detection system to detect a motion in a gesture detection mode in response to receiving the wake-up signal. The method continues by identifying the gesture as one of a close gesture and an open gesture and a non-recognized gesture in the gesture detection mode. The next step of the method is returning to the inward obstacle detection mode in response to identifying the gesture as the close gesture in the gesture detection mode. The method then includes the step of returning to the outward obstacle detection mode in response to identifying the gesture as the open gesture in the gesture detection mode. Finally, the method includes the step of operating the at least one sensor of the detection system to detect an object in a park assist mode in response to receiving the wake-up signal and the reverse-on signal.

According to yet another aspect of the disclosure, a method of operating a detection system in communication with a plurality of vehicle system controllers of a vehicle is also provided. The method includes the step of determining which of a plurality of modes of a microprocessor of the detection system should be active based on the microprocessor receiving at least one of a vehicle reverse signal and a vehicle drive signal from the plurality of vehicle system controllers in a stand-by state. The method proceeds with the step of operating at least one radar sensor of the detection system provided in a side closure panel and at least one additional radar sensor of the detection system provided in a rear closure panel each at a second power level to detect at least one of an object and a motion in a second detection zone. The method continues by operating the at least one radar sensor and the at least one additional radar sensor each at a first power level to detect the at least one of an object and a motion in a first detection zone after determining the object has moved from the second detection zone towards the vehicle. The method also includes the step of notifying the plurality of vehicle system controllers of an object detected by the at least one radar sensor or the at least one additional radar sensor.

According to yet another aspect of the disclosure, there is provided a lighting assembly for a closure panel of a vehicle having at least one vehicle system controller including a housing adapted to be mounted at least partially within an aperture provided on the closure panel, a light source housed within the housing for providing lighting associated with the closure panel, at least one sensor housed in the housing for sensing at least one of an object and a motion adjacent the closure panel and outputting data corresponding to at least one of an object and motion, the at least one sensor configured to transmit at least one detection beam through the aperture for sensing at least one of an object and a motion adjacent at least one of an outboard side and an inboard side of the closure panel, and a microprocessor electrically coupled to the at least one vehicle system controller and to the at least one sensor, and configured to operate the at least one sensor to sense at least one of an object and a motion adjacent at least one of the outboard side and the inboard side of the closure panel and communicate with the at least one vehicle system controller to initiate a vehicle function in response to processing the data corresponding to the at least one of the object and the motion.

In accordance with yet another aspect, there is provided a detection system for a rear closure panel of a vehicle having at least one vehicle system controller, the detection system including at least one sensor provided in a side closure panel operable to detect a motion adjacent the rear closure panel in a gesture detection mode, and at least one additional sensor provided in the rear closure panel operable for sensing at least one of an object and a motion adjacent the closure panel in an obstacle detection mode, and a microprocessor operable in one of the gesture detection mode and obstacle detection mode and electrically coupled to the at least one vehicle system controller and the at least one sensor at the at least one additional sensor and configured to determine which of the modes should be active based on communication with the at least one vehicle system controller, receive and process data corresponding to the at least one of the object and motion from the at least one sensor and from the at least one additional sensors based on a determination of which of the modes should be active, and initiate a vehicle function in response to processing the data corresponding to the at least one of the object and the motion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 5 and 6 illustrate an outward surface and an inward surface of a sensor printed circuit board of the detection system according to aspects of the disclosure;

FIGS. 20-23 illustrate steps of a method of operating a detection system according to aspects of the disclosure;

DETAILED DESCRIPTION

Figure 1:
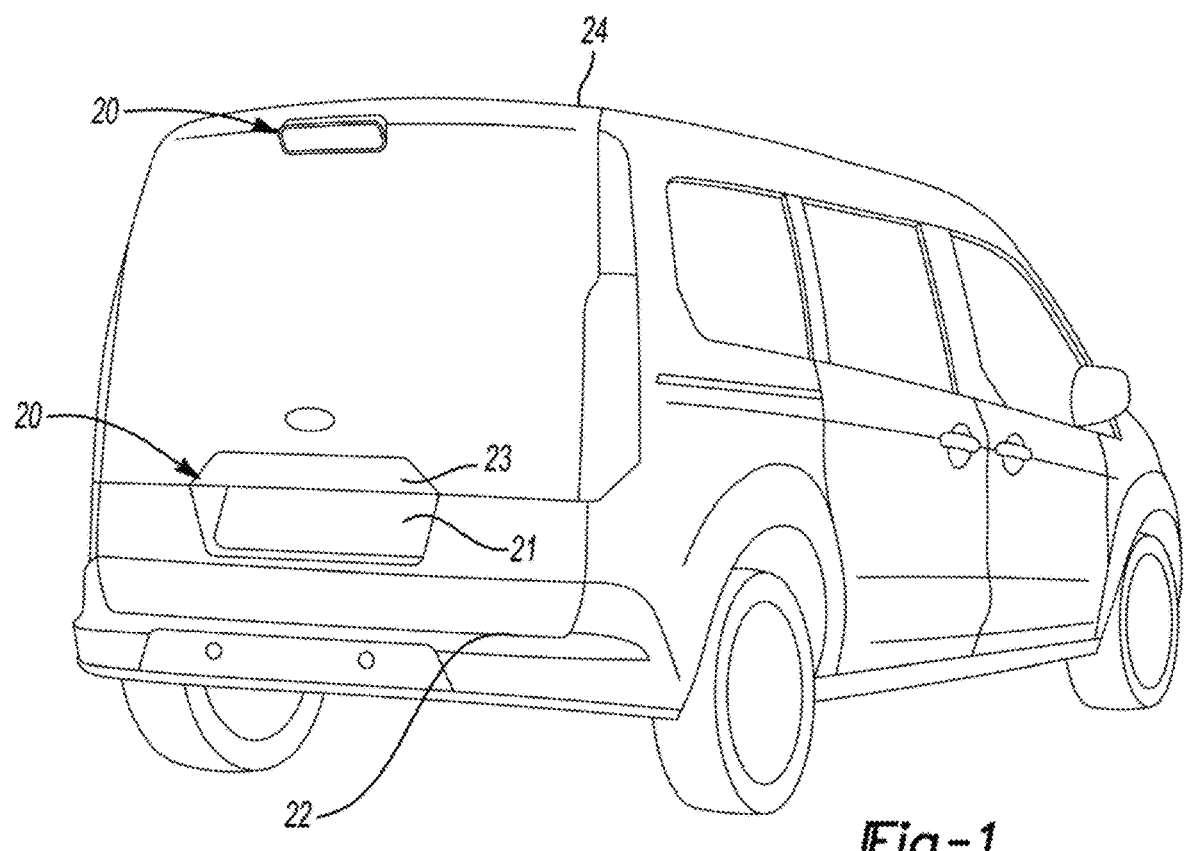
FIG. 1 illustrates a first exemplary embodiment of a detection system mounted on a liftgate of a vehicle according to aspects of the disclosure.

In the following description, details are set forth to provide an understanding of the present disclosure. In some instances, certain circuits, structures and techniques have not been described or shown in detail in order not to obscure the disclosure.

In general, the present disclosure relates to a detection system of the type well-suited for use in many vehicular closure applications. The detection system and associated methods of operation of this disclosure will be described in conjunction with one or more example embodiments. However, the specific example embodiments disclosed are merely provided to describe the inventive concepts, features, advantages and objectives will sufficient clarity to permit those skilled in this art to understand and practice the disclosure. Specifically, the example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Referring to the Figures, wherein like numerals indicate corresponding parts throughout the several views, a detection system 20 and a method of operating the detection system 20 are disclosed.

As best shown in FIGS. 1-12 an exemplary first embodiment of the detection system 20 for a closure panel 22 of a vehicle 24 having at least one, or a plurality of vehicle system controllers is provided. The detection system 20 may be provided as part of an existing vehicle accessory, which can be naturally positioned at elevated vantage positions on the closure panel 22, to take advantage of the radar range (e.g., approximately 5 m) and provide a wide angle of detection about the vehicle 24; however, using more than one detection system 20 can allow for arrangements that cover different zones. The closure panel 22 in the exemplary first embodiment is a liftgate 22 and the detection system 20 acts as a center high mounted stop light (CHMSL) disposed on the liftgate 22 (FIGS. 1, 2, 3A-3D) having illustratively a detection zone A rearward and adjacent the liftgate 22. Yet, the detection system 20 can instead or additionally be adapted to be disposed on the liftgate 22 above a license plate recess 21 disposed on the liftgate 22 (FIG. 1) for example as integrated into a license plate lighting module 23 and/or be integrated with other vehicle modules associated with the liftgate or closure panel 22. In some embodiments, such accessories may be illustratively mounted through and secured within a port or aperture of the sheet metal of the closure panel 22.

Figure 4:
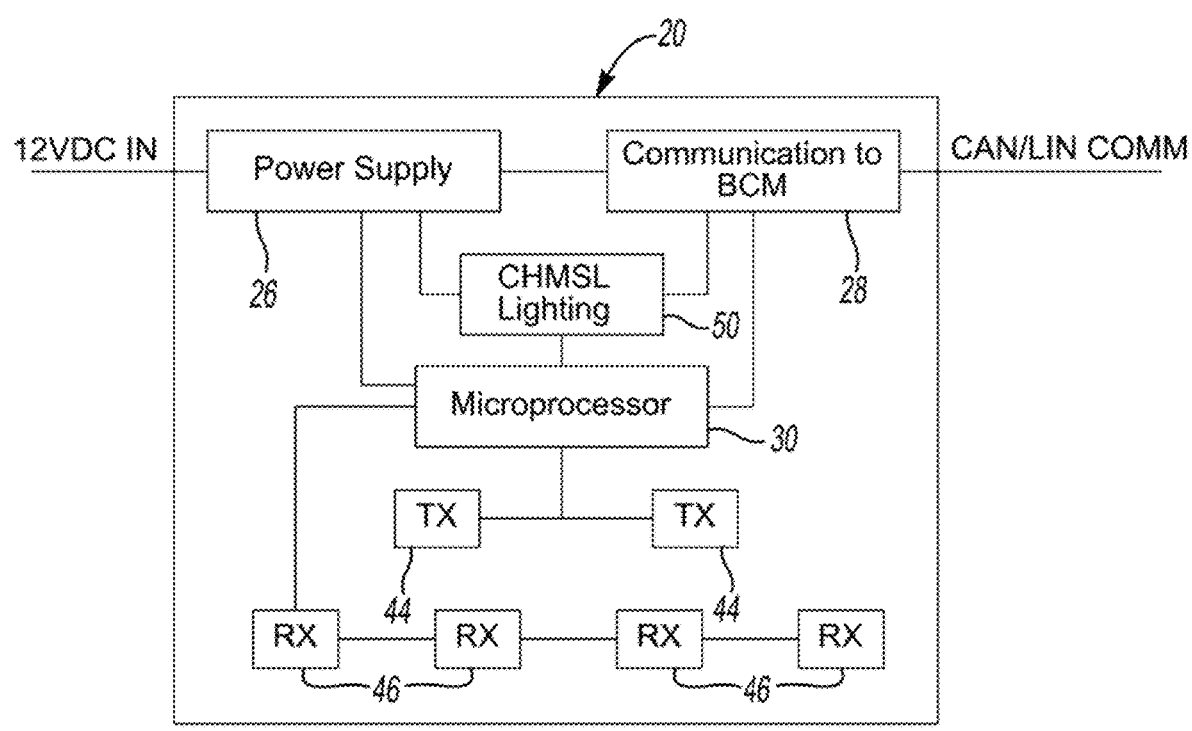
FIG. 4 is a block diagram of the detection system according to aspects of the disclosure.

As best shown in FIG. 4, the detection system 20 includes a power supply unit 26 for coupling a power supply of the vehicle 24 to provide power to the detection system 20. Additionally, the detection system 20 includes a communication unit 28 electrically coupled to the power supply unit 26 for communicating with the plurality of vehicle system controllers. All of such components may be enclosed within an electromagnetic (e.g. radar) penetrable housing, such as one formed from plastic as an example, configured to be attached to the liftgate 22, and more particularly mounted in or adjacent to a port or aperture in the sheet metal of the closure panel 22.

Figure 7:
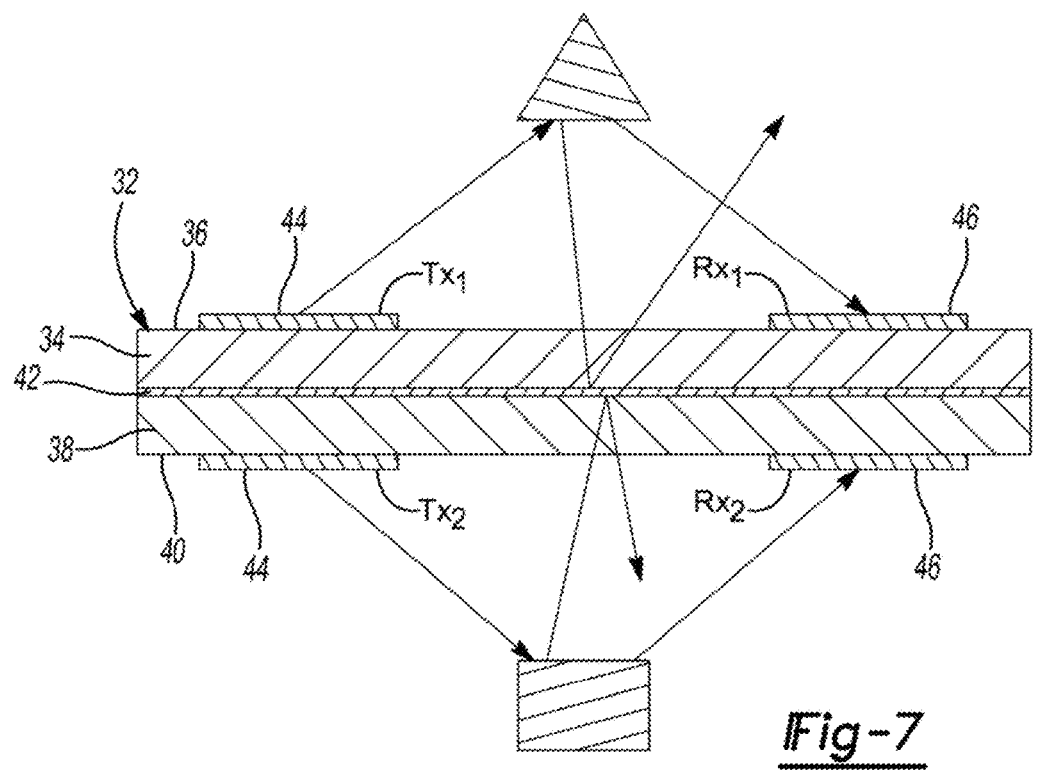
FIG. 7 illustrates a cross sectional view of the sensor printed circuit board of FIGS. 5 and 6 according to aspects of the disclosure.
Figure 8:
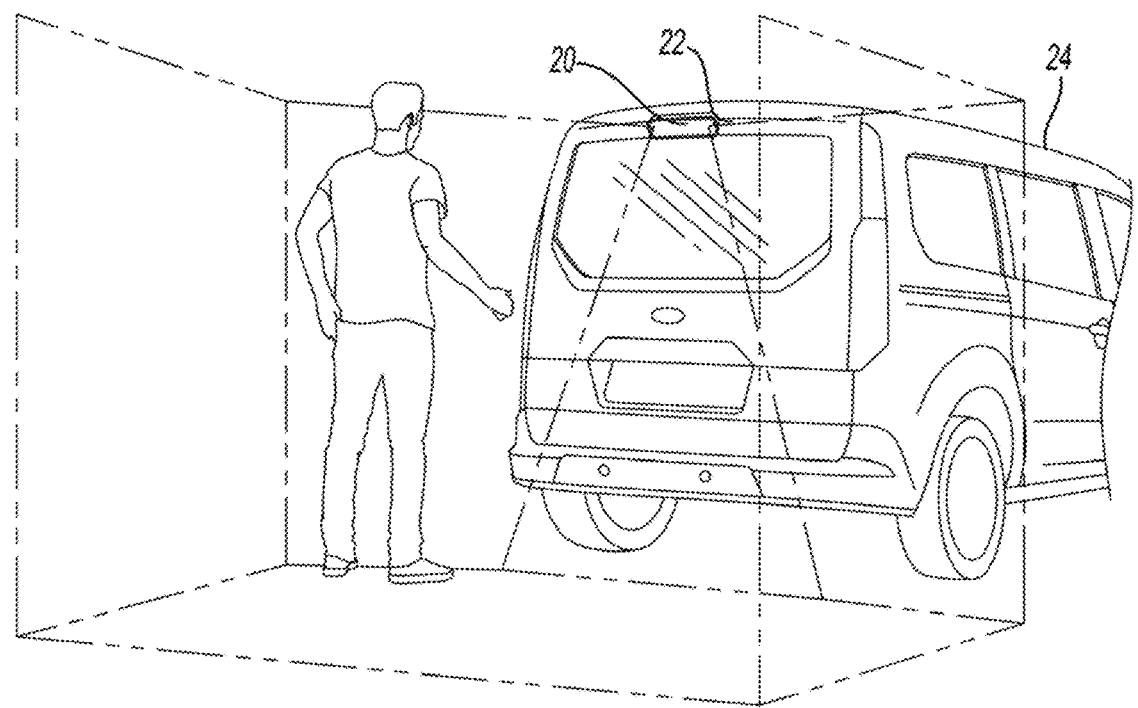
FIGS. 8, 9A and 9B illustrate detection of obstacles in a path of a liftgate in an outward obstacle detection mode of the detection system according to aspects of the disclosure.

As best shown in FIGS. 5-7, the power supply unit 26, microprocessor 30, communication unit 28, and at least one sensor 44, 46 (discussed below) are disposed on a sensor printed circuit board 32. The sensor printed circuit board 32 includes a first layer 34 (FIG. 7) defining an outward surface 36 and a second layer 38 extending along the first layer 34 and defining an inward surface 40 opposite the outward surface 36. The sensor printed circuit board 32 also includes an insulating plane 42, such as layer of radar absorbing material (RAM) formed for example as a planar and/or stacked frequency selective surface (FSS) arrays printed or etched on a substrate of the printed circuit board 32 and which has a dielectric constant that promotes attenuation of a reflected or emitted radar waves 33 as commonly known in the art and described as but one non-limiting example, and that is disposed between the first layer 34 and the second layer 38. In other words, the sensor printed circuit board 32 can be a double sided PCB layout having the insulating layer between layers 34, 38.

Figure 3A:
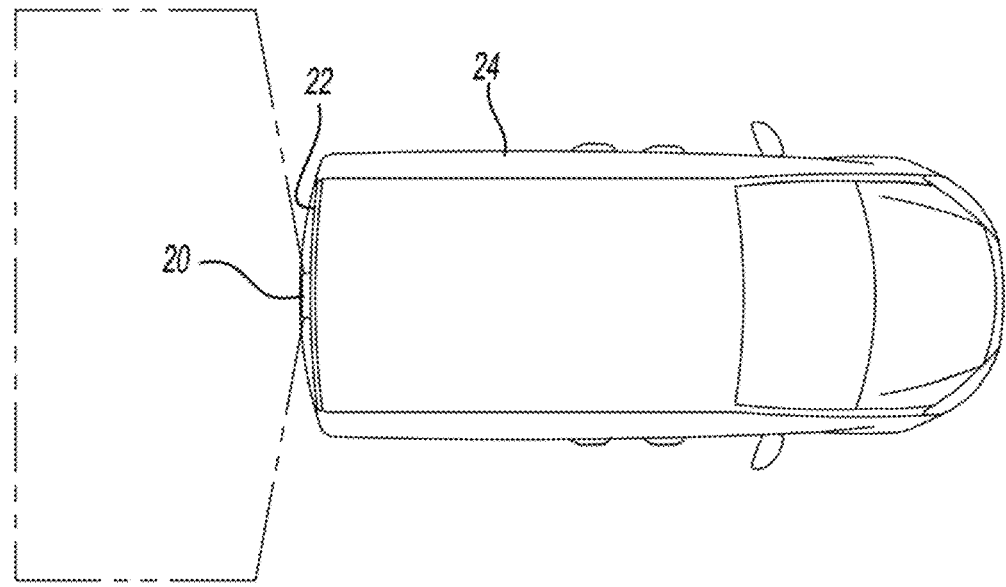
FIGS. 3A-3D illustrate a coverage area of the detection system of FIG. 1 according to aspects of the disclosure.
Figure 3B:
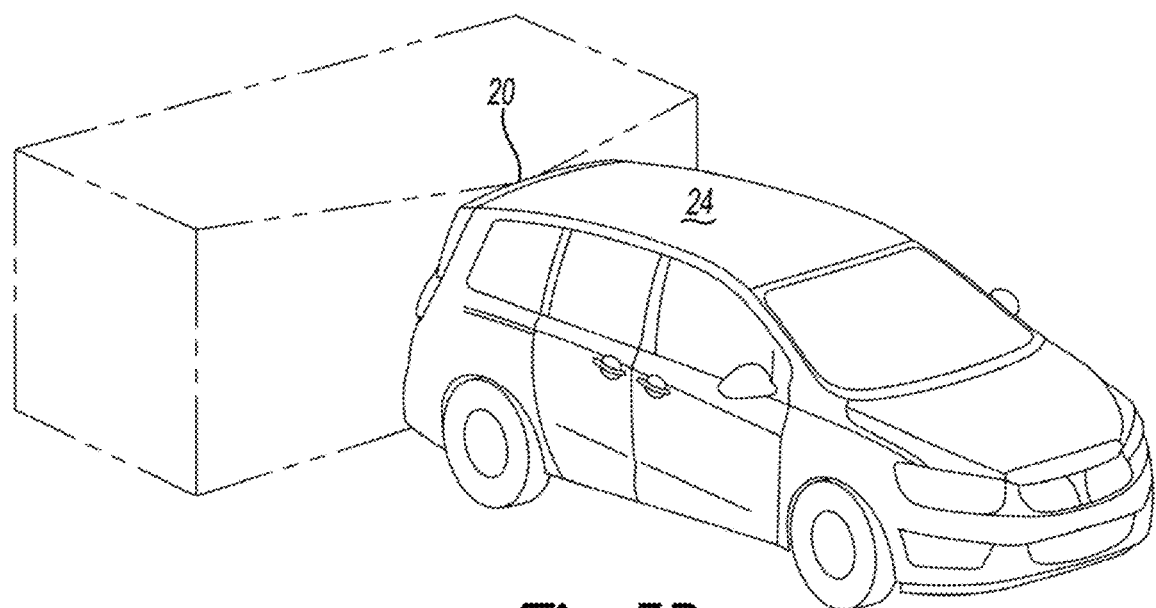
Figure 3C:
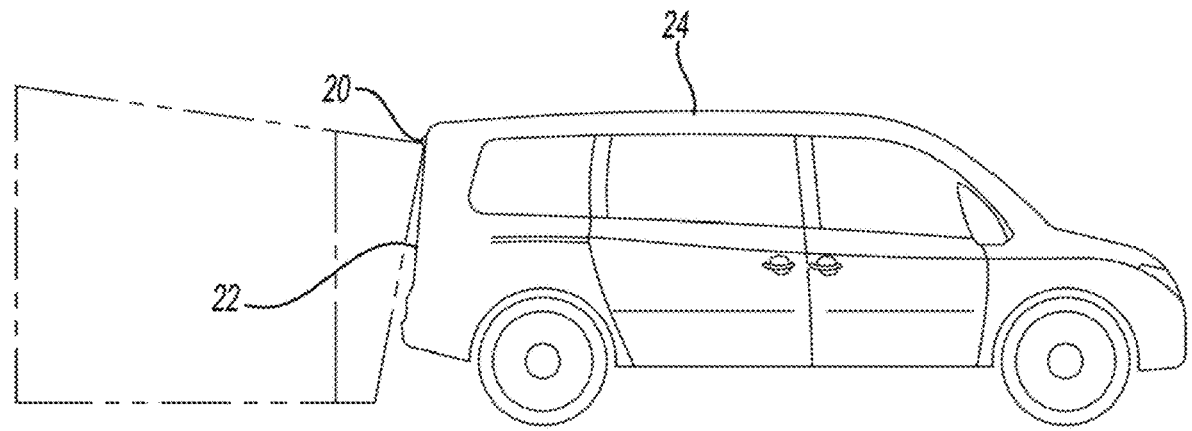
Figure 3D:
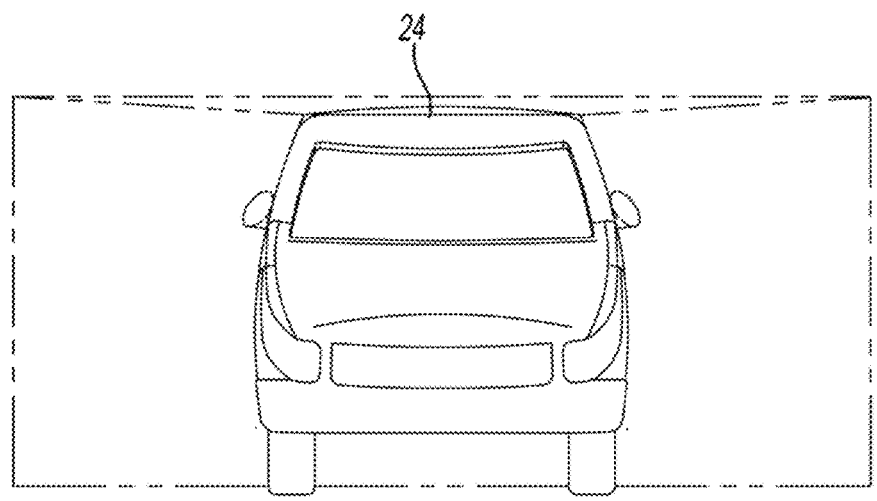

The detection system 20 also includes the at least one sensor 44, 46 for sensing at least one of an object and a motion 19 adjacent the closure panel 22 and outputting data corresponding to at least one of the object and the motion. Specifically, the at least one sensor 44, 46 includes a plurality of radar transmit antennas 44 for transmitting a plurality of radar beams outwardly therefrom and a plurality of radar receive antennas 46 disposed on the outward surface 36 of the sensor printed circuit board 32 for receiving the plurality of radar beams from the radar transmit antennas 44 reflected from the object (FIG. 5). The at least one sensor 44, 46 also includes a plurality of radar transmit antennas 44 for transmitting a plurality of radar beams outwardly therefrom and a plurality of radar receive antennas 46 disposed on the inward surface 40 of the sensor printed circuit board 32 for receiving the plurality of radar beams from the radar transmit antennas 44 reflected from the object (FIG. 6). So, each layer of the sensor printed circuit board 32 has radar antennas 44, 46 mounting thereto and projecting radar beams away from the respective surface. In another embodiment, multiple sensor printed circuit boards 32 may be provided at angles relative to one another (e.g., 160 degrees relative to their planes) for expanding the detection area of the antennas 44, 46, for example to increase the detection arear to the sides of the vehicle 24 as illustratively shown in FIG. 3A shown as detection zone B. Antennas 44, 46 on a respective side (or surface) can be operated for detection of volumes away from the vehicle 24 or volumes towards the vehicle 24. The insulating plane 42 ensures that the radar detectors on each side of the sensor printed circuit board 32 do not receive reflected radar beams emitted from the other side of the sensor printed circuit board 32. According to an aspect, the antennas 44, 46 can be etched into the sensor printed circuit board 32 at the time of manufacture.

According to an aspect, the plurality of radar transmit antennas 44 disposed on the outward surface 36 includes a pair of radar transmit antennas 44 and the plurality of radar receive antennas 46 disposed on the outward surface 36 includes four radar receive antennas 46. Likewise, the plurality of radar transmit antennas 44 disposed on the inward surface 40 includes a pair of radar transmit antennas 44 and the plurality of plurality of radar receive antennas 46 disposed on the inward surface 40 includes four radar receive antennas 46. The plurality of radar transmit antennas 44 and the plurality of radar receive antennas 46 operate at 80 gigahertz. Nevertheless, it should be appreciated that the plurality of radar transmit antennas 44 the plurality of plurality of radar receive antennas 46 on either surface can comprise fewer or more radar transmit and receive antennas 44, 46 and may operate at other frequencies, such as 24 or 60, or 85 gigahertz.

The detection system 20 further includes a microprocessor 30 (FIGS. 4 and 5) operable in a plurality of modes and electrically coupled to the power supply unit 26 and the at least one sensor 44, 46 and the communication unit 28. In general, the use of radar (providing resolution, range, and material penetrating properties) properly positioned for coverage of a volume about the liftgate 22, can perform the multiple detection functions. Additionally, the resolution provided by radar can provide not only obstacle detection, but also increased resolution needed for gesture recognition (even facial gesture detection), at ranges for example at foot level near the bumper or about ground level 49 but also at distances away from liftgate 22. Also, the elimination of blindspots provided by the detection system 20 as described herein can improve the safe and reliable operation of the vehicle and closure panel 12 as compared to known systems relying on multiple sensors provided on or adjacent the closure panel to achieve such. Thus, the plurality of modes includes at least one of a gesture recognition mode and a park assist mode and an outward obstacle detection mode and an inward obstacle detection mode.

Figure 9A:
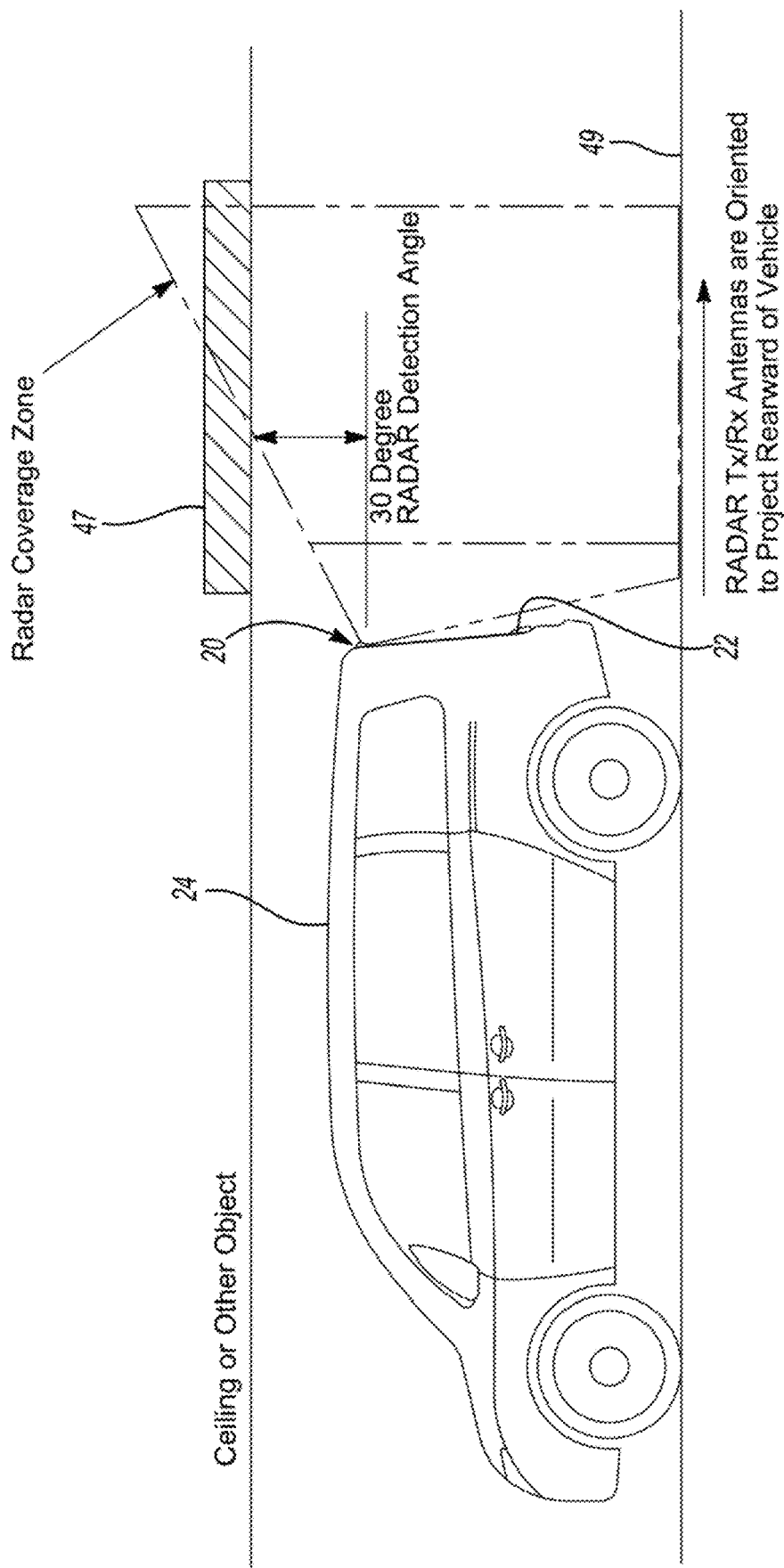
Figure 9B:
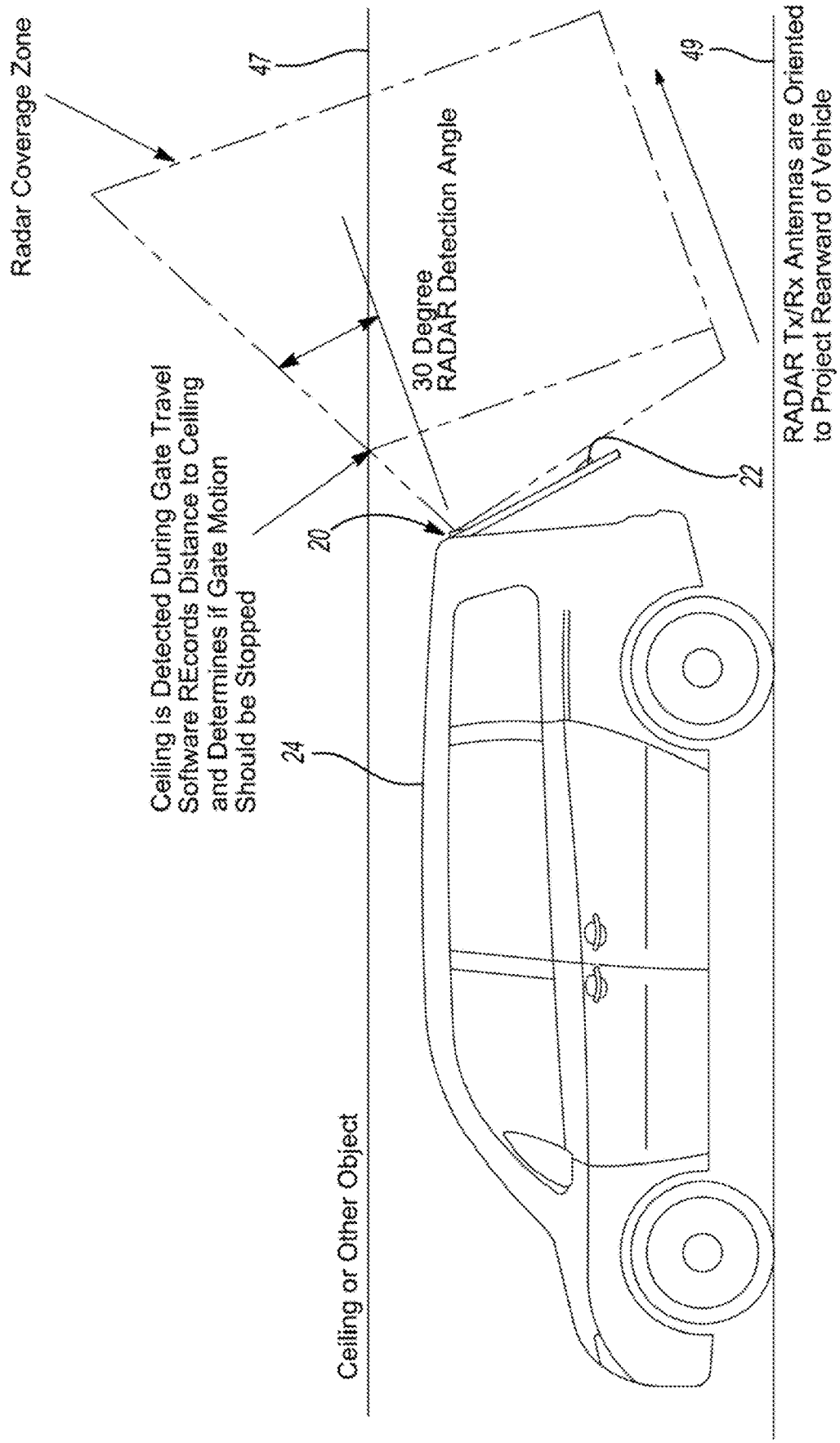
Figure 10:
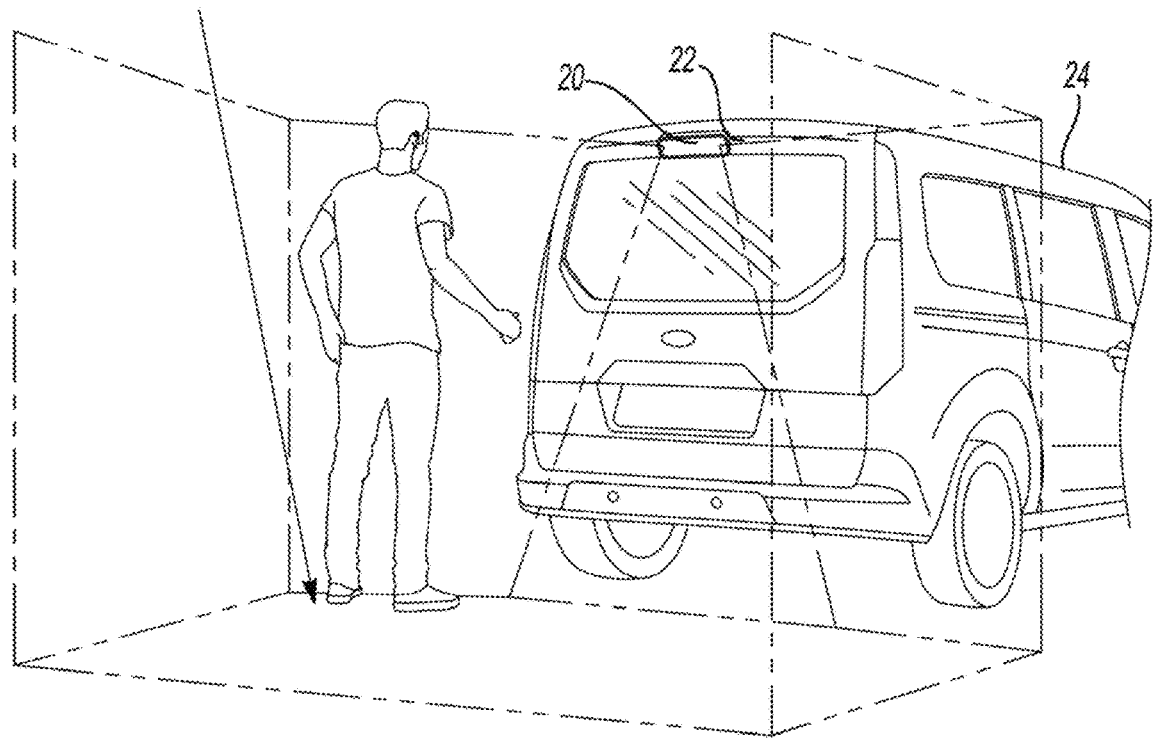
FIG. 10 illustrates detection of a gesture in a gesture detection mode of the detection system according to aspects of the disclosure.
Figure 11:
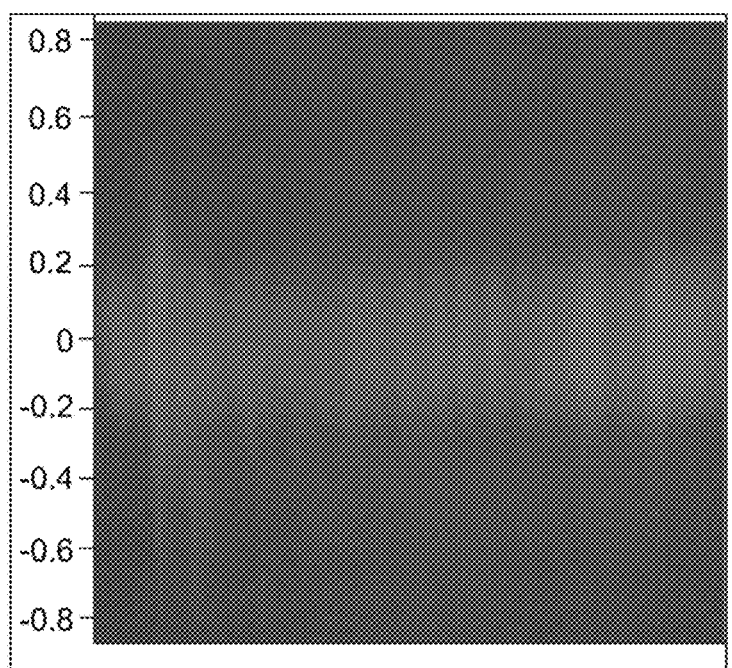
FIG. 11 illustrates a radar signature of a moving foot located one meter away from a bumper of the vehicle in the gesture detection mode of the detection system according to aspects of the disclosure.

More specifically, the outward obstacle detection mode is for detection of obstacles in the path of the liftgate 22 as it opens for controlling the stoppage of the liftgate 22, for example, detection of a human (FIG. 8) and detection of a ceiling as the liftgate 22 opens (FIG. 9A and FIG. 9B). As illustrated in FIGS. 9A and 9B, the radar transmit and receive antennas 44, 46 are oriented to project rearward and away from the vehicle 24 with a detection angle that projects upwardly, downwardly, and away from the vehicle 24. Due to the rotation/pivoting of the liftgate 22 during opening or closing, such a detection angle that projects upwardly and away from vehicle 24 can be acute, and illustratively 30 degrees relative to the horizon, since such a detection angle is sufficient to detect any obstacles, such as a ceiling 47, that would be in the path of the liftgate 22 as it is being opened. For example, a liftgate 22 not moving directly to a vertical position or further to a position overtop of the vehicle 24 would not require any objects to be detected in this space, and so directing the the at least one sensor 44, 46 overtop of the vehicle 24 or towards the vehicle is not required. By utilizing the preexisting movement of the liftgate 22 to provide increased detection range, the radar transmit and receive antennas 44, 46 can be configured to be orientated rearward the vehicle to simultaneously detect objects both on the ground 49 rearward the liftgate 22, and above the liftgate 22 when the liftgate 22 is in the closed position, and any objects, such as a ceiling 47, in the path of the liftgate 22 as it is opened. As such multiple sensors with dedicated areas of detection having different orientations are not required. Such a detection can be useful when parking in a garage so the liftgate 22 does not hit the garage door, or garage door opener, when operating in park assist mode, or in an underground parking to avoid upwards obstacles such as pipes or ceilings, etc. when operating in an obstacle detection mode. According to an aspect, the ceiling 47 and the distance thereto can be detected by the detection system 20, and then, for example, the angle of the opening of the liftgate 22 can be automatically changed by sensing the ceiling 47 and controlling the gap between the ceiling 47 and the liftgate 22. The inward obstacle detection mode is for detection of obstacles in the path of the liftgate 22 as it closes for controlling the stoppage of the liftgate 22, for example, detection of a human and/or detection of an object which would cause damage to the liftgate 22 or vehicle 24 (e.g., a broom resting on the bumper, or a 2×4 piece of wood protruding from the interior of the vehicle 24). Thus, if the liftgate 22 is being operated from an opened position, the inwardly facing sensors 44, 46 (interior facing radar sensors) can be operated for obstacle detection (see FIG. 13B). The park assist mode is for detection of obstacles during the reverse movement of the vehicle 24. Therefore, if the vehicle 24 is in reverse, the detection system 20 can operate to detect objects in the path of reverse of the vehicle 24. The coverage area of the detection system 20 is such as to allow detection of objects useful for parking assist (e.g., an alarm is sent to the driver if an object is detected). The gesture recognition mode is for gesture recognition for liftgate 22 opening activation (e.g., detection of a foot, a hand, or a face gesture). So, if the liftgate 22 is closed and the vehicle 24 is in park, the detection system 20 can operate in the gesture recognition mode, looking for a person to command opening 48 of the liftgate 22, as shown in FIG. 10. The position of the detection system 20 can cover the height of a human, and the resolution of the radar based sensor 44, 46 can provide for detection of precise gestures for controlling activation of the closure panel 22. As an example, FIG. 11 shows a radar signature of a moving foot located one meter away from a bumper of the vehicle 24. It should be appreciated the more or fewer modes may be utilized. The detection system 20 is thus configurable to operate in different modes based on the state of the vehicle, and command operation of a vehicle function accordingly. For example when operating in the park assist mode, the detection system 20 can command operation of an audible or visual alert system of the vehicle 24, or activate a braking or acceleration function. For example, when operating in the gesture recognition mode, the detection system 20 can command operation of the closure panel 22 (e.g., open) by activating a closure actuator/motor subsequent to a positive activation/access gesture. For example when operating in the outward obstacle detection mode, the detection system 20 can command operation of the closure panel 22 (e.g., open) by deactivating or stopping a closure actuator/motor. For example when operating in the inward obstacle detection mode, the detection system 20 can command operation of the closure panel (e.g., open) by deactivating or stopping a closure actuator/motor.

The microprocessor 30 is configured to determine which of the plurality of modes should be active based on communication with the plurality of vehicle 24 system controllers (e.g., body control module). In addition, the microprocessor 30 is configured to receive and process data corresponding to the at least one of the object and motion from the at least one sensor 44, 46 based on the determination of which of the plurality of modes should be active. Finally, the microprocessor 30 is configured to initiate movement of the closure panel 22 in response to processing the data corresponding to the at least one of the object and the motion.

Figure 12:
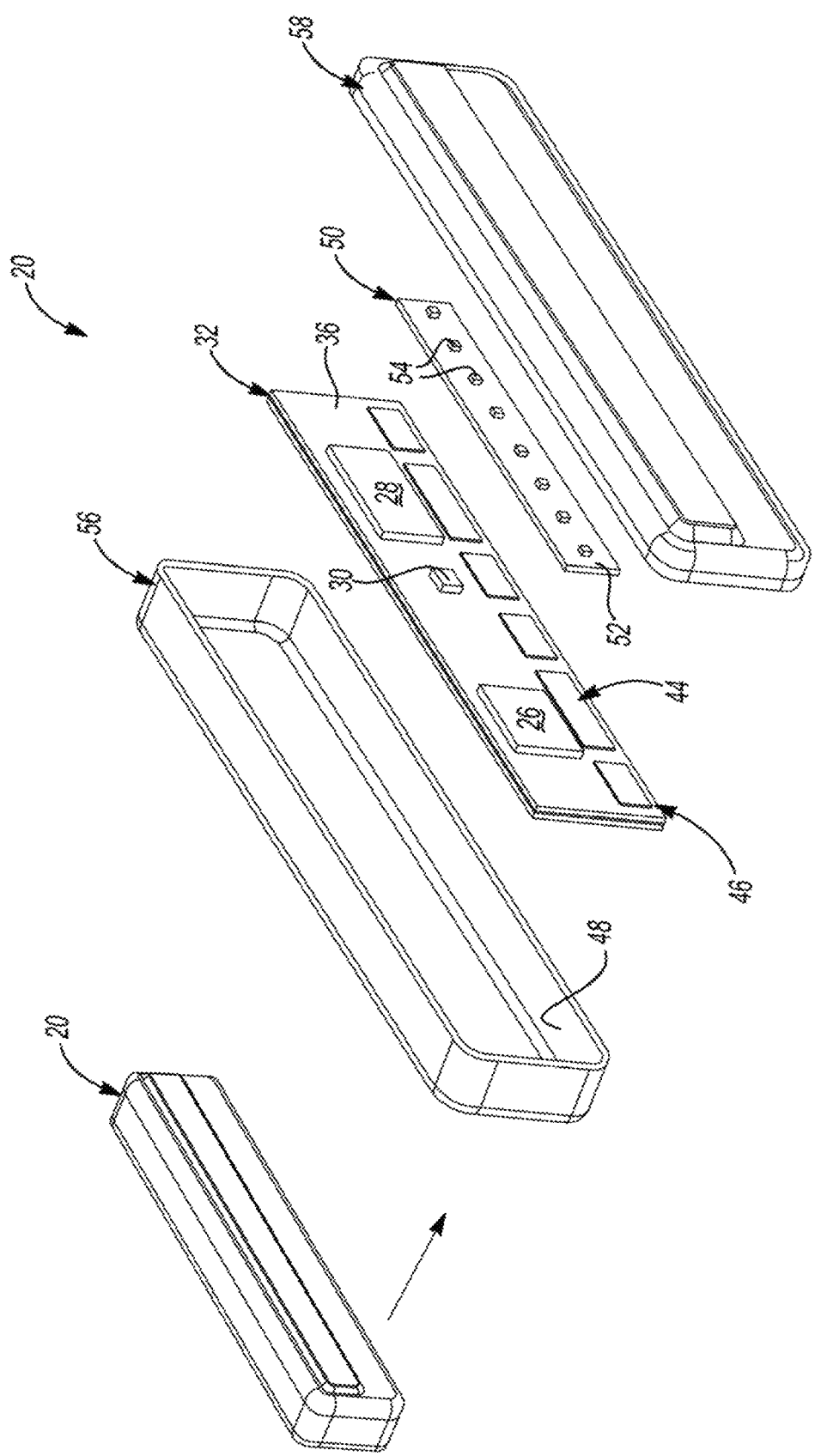
FIG. 12 is an exploded view of the detection system of FIG. 1 according to aspects of the disclosure.

As best shown in FIG. 12, the detection system 20 can also include a lighting subassembly 50 including a lighting printed circuit board 52 coupled to the sensor printed circuit board 32. The lighting printed circuit board 52 includes a plurality of light emitting diodes 54 (LEDs) and is electrically coupled to the power supply unit 26 and the microprocessor 30 and the communication unit 28 for providing lighting associated with the closure panel 22 (e.g., CHMSL lighting).

Figure 13A:
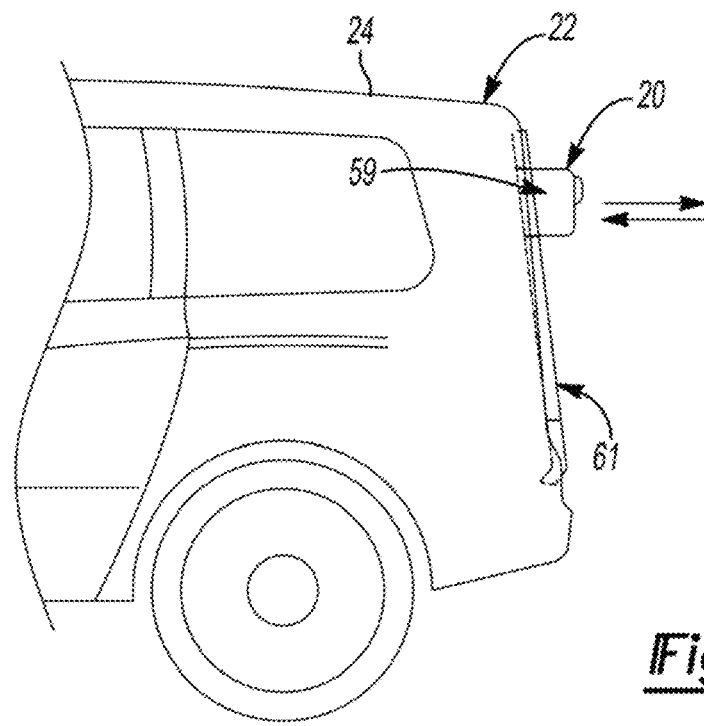
FIGS. 13A and 13B illustrate operation of the detection system depending on a position of the liftgate according to aspects of the disclosure.
Figure 13B:
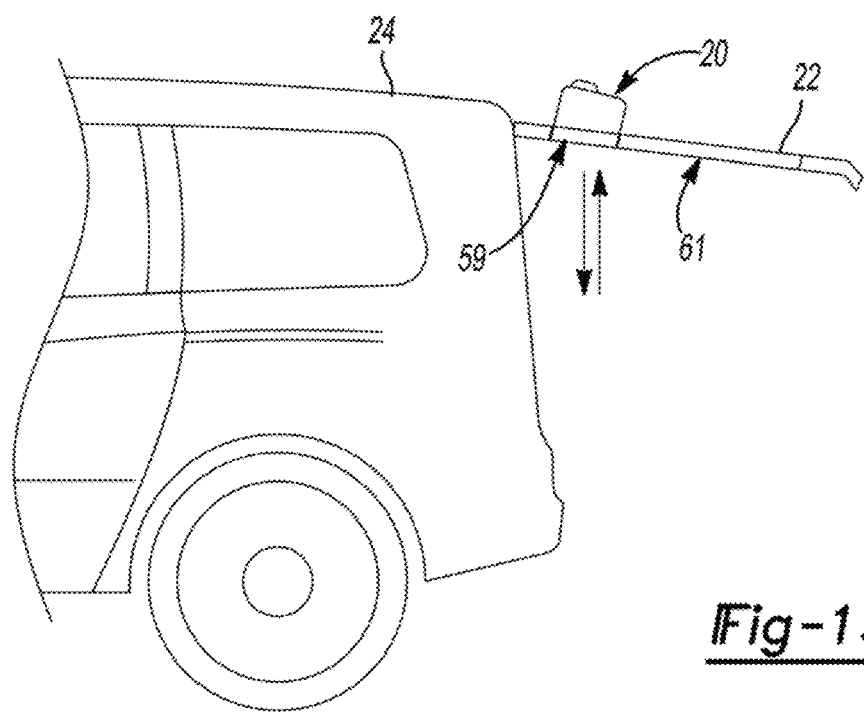

Additionally, the detection system 20 can include a housing 56 (FIG. 12) defining an opening 48 and enclosing the sensor printed circuit board 32 and the lighting printed circuit board 52. A lens cover 58 (FIG. 12) is coupled to the housing 56 and extends over the lighting printed circuit board 52 for covering the opening 48 and allowing light from the plurality of light emitting diodes 54 of the lighting subassembly 50 to shine outwardly from the detection system 20. The housing 56 and the lens cover 58 may be illustratively made of radar penetrating material, such as plastic. Providing the detection system 20 as part of an existing vehicle accessory, such as a lighting assembly or lighting module (e.g., CHMSL lighting) overcomes drawbacks associated with other known vehicle accessories, such as a roof separate edge, or a spoiler, or an inner closure trim panel which are accessories configured to be mounted away from an electromagnetic wave non-penetrable material, such as on an exterior metal panel of the vehicle, and adjacent other electromagnetic wave interfering vehicle accessory components, with such sheet metal and components tending to reduce the detection coverage of any sensor provided with such other vehicle accessories. Generally, an existing vehicle accessory in accordance with an embodiment, such as a lighting assembly, is mounted in close proximity to a vehicle window (e.g. rear window 61) sealing a port to the closure panel 22 sheet metal, providing an unobstructed line of sight for transmitted and received detection beams 119 (e.g. electromagnetic waves, such as radar) either away from the sensor printed circuit board 32, through the adjacent vehicle window (e.g. rear window 61), and/or through a vehicle accessory port or aperture 59 formed in the closure panel 22 sheet metal for receiving the housing 56 to be secured therein during assembly so as to allow transmission of signals such as radar waves through the port 59 or window 61 to be emitted and detected by the plurality of antennas 44, 46 and to pass unobstructed towards and from an inner side of the closure panel 22. With reference to FIG. 13B, the aperture 59 or window 61 allows detection beams 119 to be transmitted away from the liftgate 22 and towards the liftgate 22 on both an inboard side D shown in ghosted view as extending from the inner side 123 of the closure panel and an outboard side E shown in ghosted view as extending from the outer side 125 of the closure panel. In an exemplary embodiment where the sensor printed circuit board 32 may be provided in a housing 56 at least partially received within the port 59 but positioned on the outboard side E as illustrated in FIGS. 13A and 13B, the aperture 59 or window 61 allows detection beams 119 to be transmitted away from the liftgate 22 and towards the liftgate 22 on the inboard side D by passage through the port in the sheet metal formed in the liftgate 22 as the window 61 or the aperture 59. In another exemplary embodiment where the sensor printed circuit board 32 may be provided in a housing 56 at least partially received within the port 59 but positioned on the inboard D side, similarly, the aperture 59 or window 61 allows detection beams 119 to be transmitted away from the liftgate 22 and towards the liftgate 22 on the outboard side E by passage through the port in the sheet metal of the liftgate 22 as formed as the window 61 or the aperture 59. In another embodiment, the closure panel 22 may be formed at least partially from a radar penetrable material, such as plastic or a composite material, the detection system 20 being part of an existing vehicle accessory having a housing 56 disposed on one of the inboard side D or the outboard side E without being mounted adjacent to or at least partially within an aperture, such as port 59 or window 61, for example it may be mounted flush using fasteners (e.g., screw or bolts, or clips) on the outer side 125. As a result of the detection system 20 capable of detecting one of a gesture and a motion on the inboard side D, a user within the interior zone E of the vehicle (e.g., rear cabin, back set, cargo space) can initiate a gesture to open and close the liftgate 22. Such a dual coverage detection system 20 provides for custom coverage on both the inboard and outboard sides of the liftgate 22, for example when the liftgate 122 opens or closes, as well as reduces and eliminates blindspots during the movement of the liftgate 22 without the requirement of operating multiple sensors with each overlapping areas of coverage depending on the position of the liftgate 22.

Figure 2:
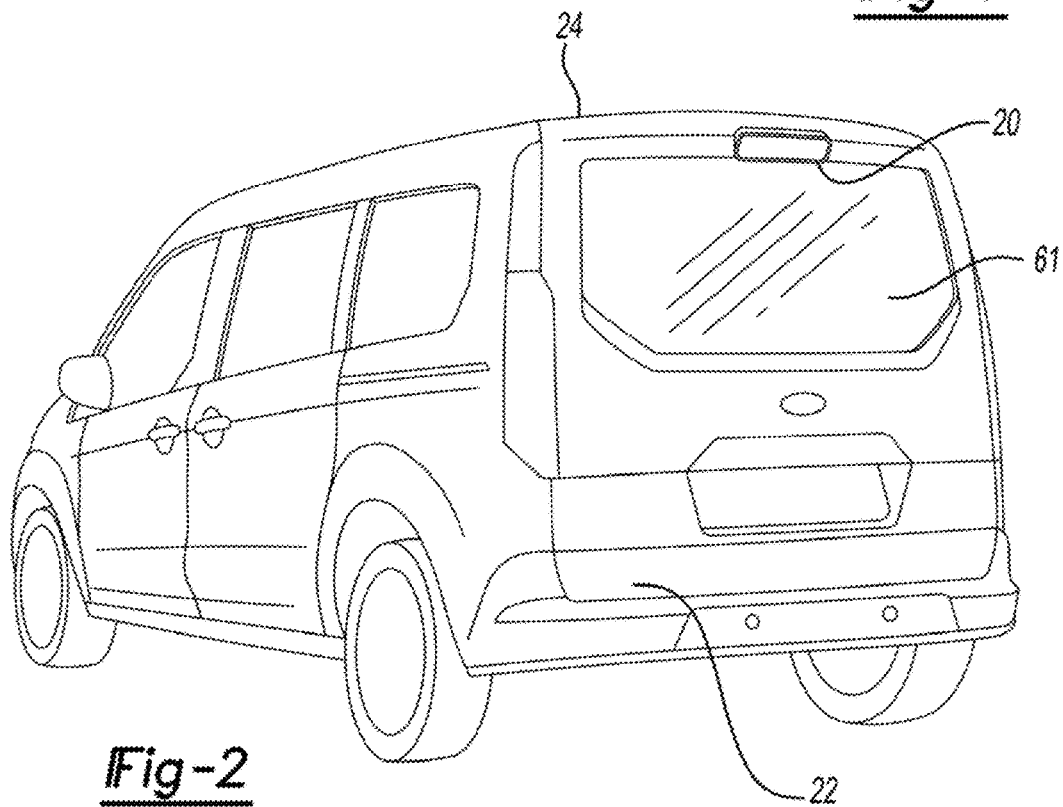
FIG. 2 illustrates an enlarged view of the detection system of FIG. 1 according to aspects of the disclosure.
Figure 2A:
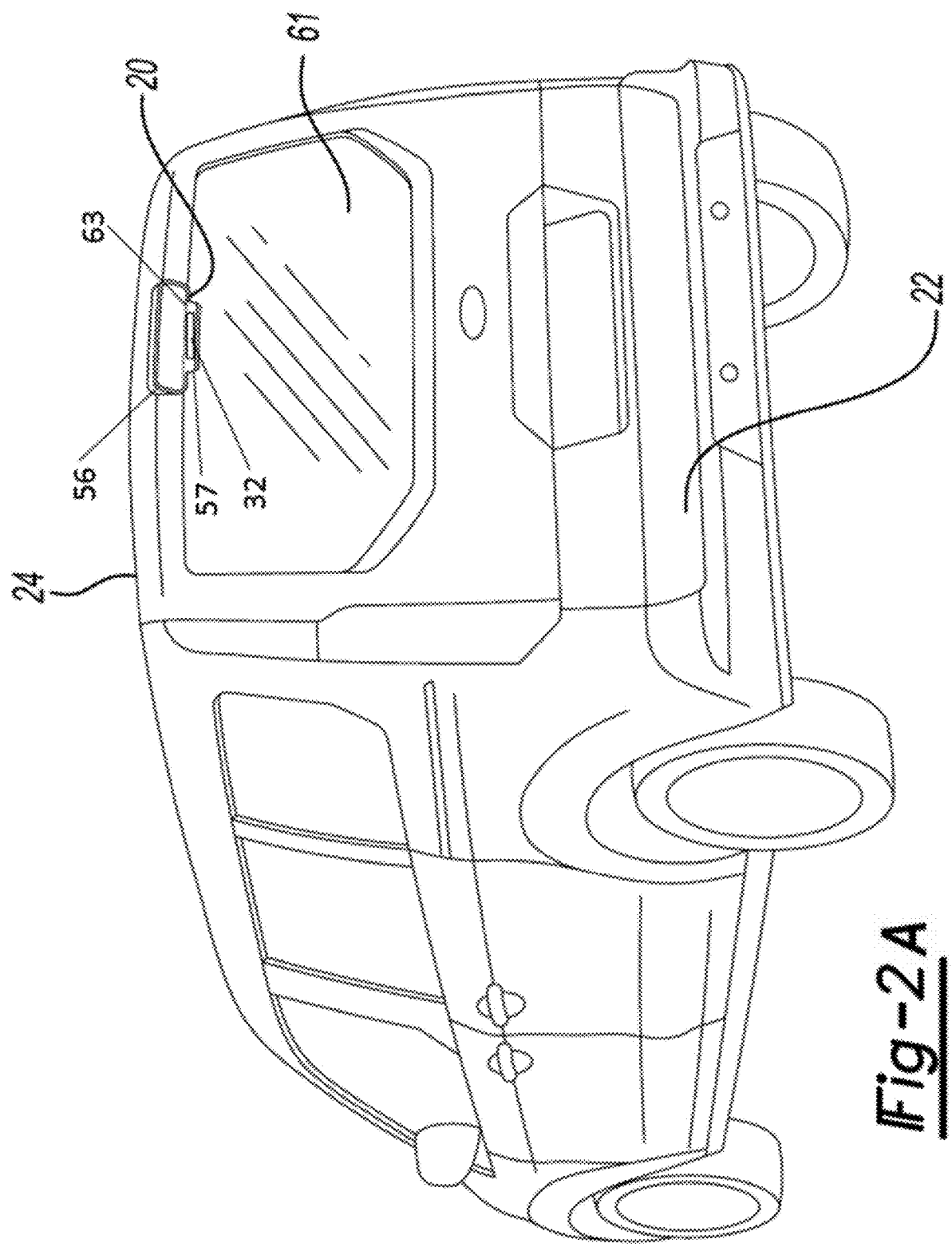
FIGS. 2A and 2B illustrate an enlarged view of the detection system of FIG. 1 according to another aspect of the disclosure.
Figure 2B:
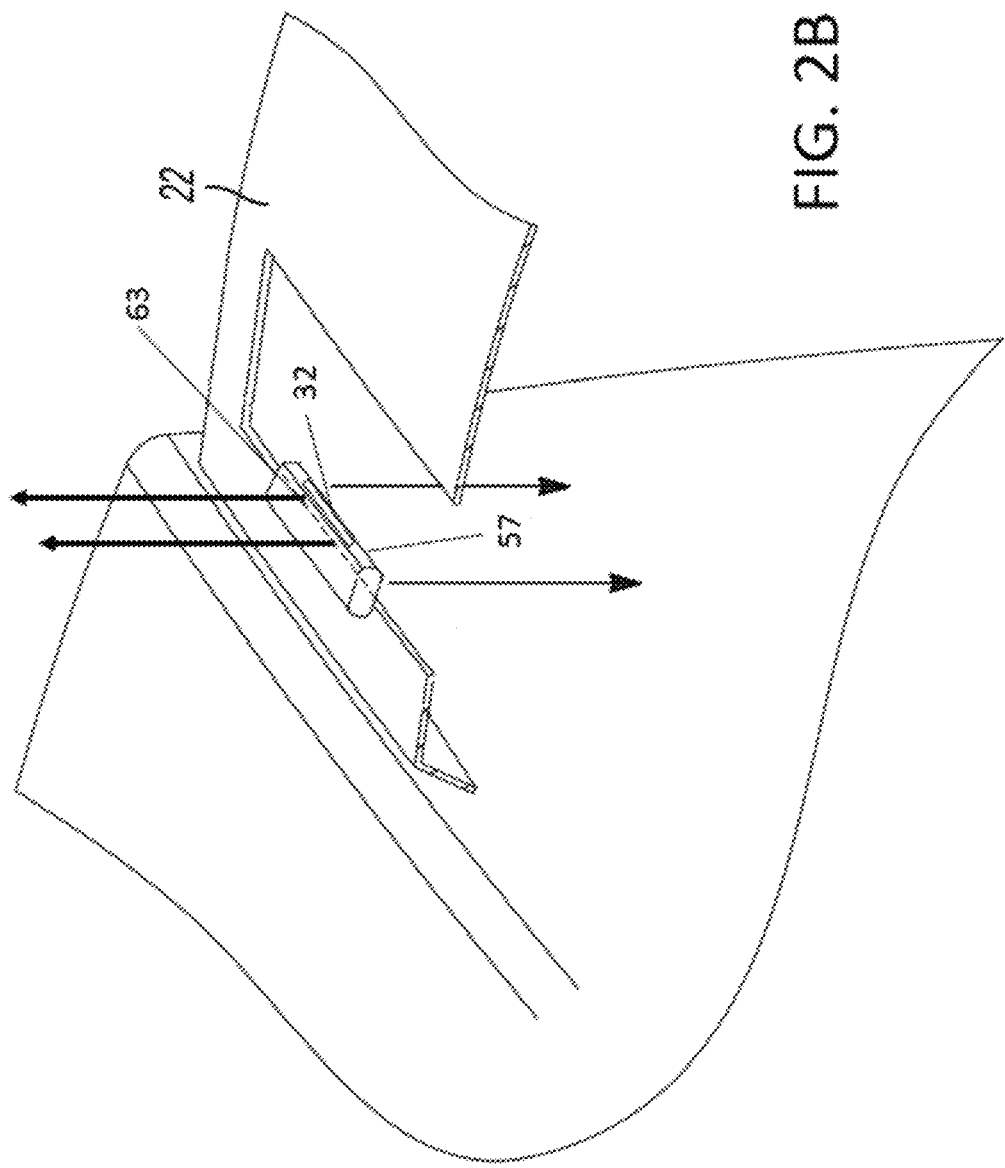

With reference to FIGS. 2A, and 2B in accordance with another illustrative embodiment, housing 56 (FIG. 12) is provided with an extending portion 57 extending from a bottom portion of the housing 56 in an overlapping configuration with the window 61 and further expanding the opening 48 for enclosing the sensor printed circuit board 32, such that the printed circuit board 32 is illustratively positioned directly adjacent and overlapping the window 61 for providing coverage through the window 61 port without obstruction from any intervening vehicle accessory, light, or from sheet panel edge 63 (shown in phantom line). The extending portion 57 may be illustratively made of radar penetrating material, such as plastic.

Because, the sensor printed circuit board 32 on which the plurality of radar transmit and receive antennas 44, 46 can be mounted is double sided, the need for additional antennas 44, 46 on the interior of the liftgate 22 can be eliminated, and reducing wiring and component costs as well as assembly and installation costs. The disclosed attachment of the detection system 20 to the liftgate 22 can take advantage of the movement of the liftgate 22, as shown in FIGS. 13A and 13B. As the liftgate 22 is opened, the sensing zone of the detection system 20 extends upwardly and away from the vehicle 24 to detect obstacles that the liftgate 22 may hit, for example a garage door or opener. However, as this detection area is moved, the plurality of antennas 44, 46 on the inside of the liftgate 22 can be activated to compensate for the lost coverage to continue to provide obstacle detection rearward the vehicle 24. An aperture 59 in the sheet metal of the liftgate 22 is illustratively provided so as to allow radar signals emitted and detected by the plurality of antennas 44, 46 inwardly facing away from the liftgate 22 as oriented inwardly to pass through the liftgate 22 unobstructed. If an aperture was not provided the radar signals would be reflected off of the sheet metal. The detection system 20 can be provided adjacent to the aperture 59 or within the aperture 59, or the like. Alternatively, the plurality of antennas 44, 46 may be directed to pass through the aperture 59 in the sheet metal of the liftgate 22 used to form the rear window 61 (see FIG. 2). The disclosed integration of the detection system 20 to the existing vehicle accessory, such as a lighting assembly (e.g., CHMSL lighting) can take advantage of the prexisting aperture 59 of the liftgate 22 for mounting a lighting assembly to the closure panel 22 thereby providing an unobstructed line of sight for the propagation of the radar signals emitted and detected by the plurality of antennas 44, 46 both outboard and inboard of the closure panel 22, without the requirement to form an additional port in the closure panel 22 requiring additional assembly steps to seal and conceal such a port using body filler, primer, paint and other plugging components. As well, the disclosed integration of the detection system 20 to the existing vehicle accessory, such as a lighting assembly (e.g., CHMSL lighting) can take advantage of the prexisting power and control signal lines being provided to the existing vehicle accessory for powering and the sensors 44 and microcontroller 32 and for communicating with other vehicle controllers 102.

Figure 14A:
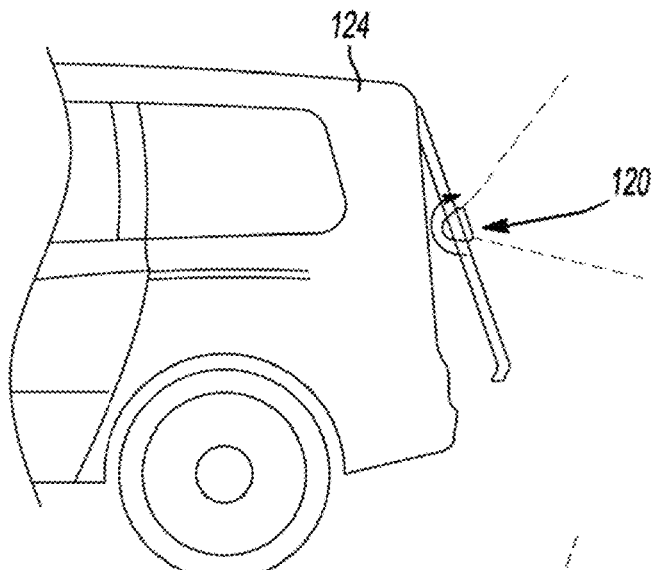
FIGS. 14A-14C illustrate a second exemplary embodiment of a detection system mounted on a liftgate of a vehicle according to aspects of the disclosure.
Figure 14B:
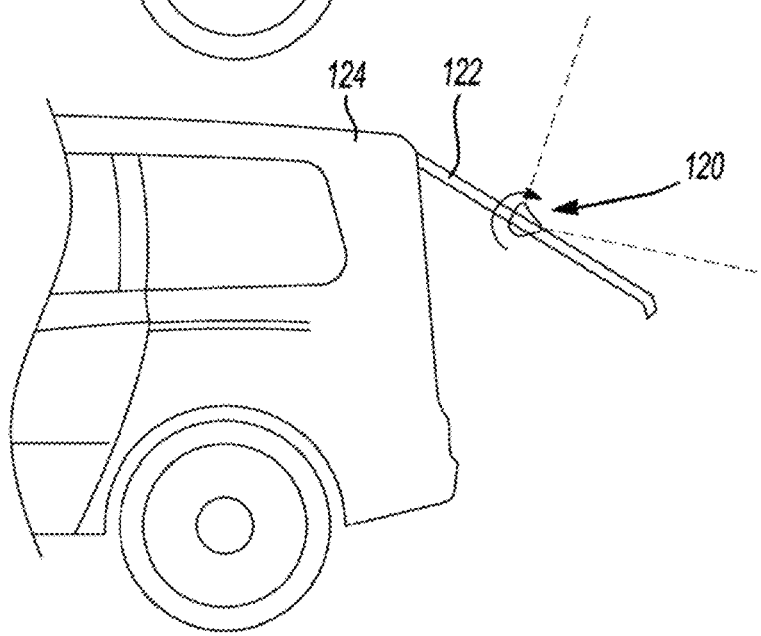
Figure 14C:
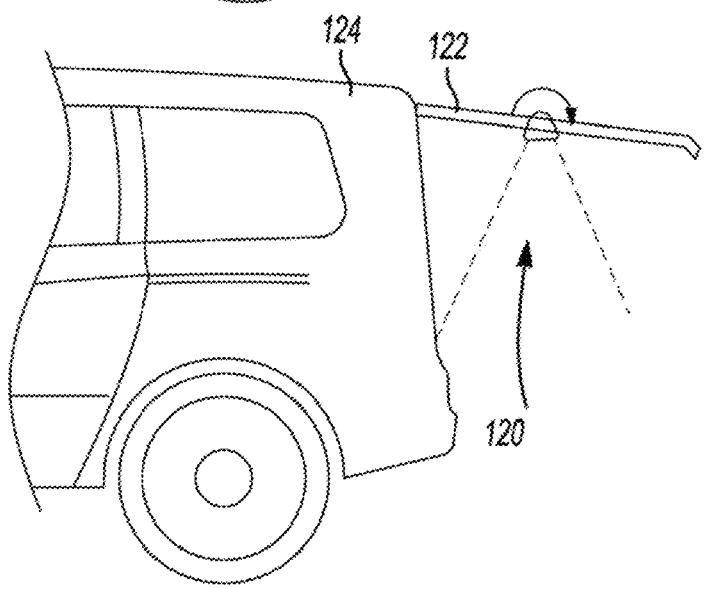

While the detection system 20 of the first exemplary embodiment is fixedly mounted, FIGS. 14A-14C illustrate a second exemplary embodiment of the detection system 120. In the second exemplary embodiment, the detection system 120 is adapted to be rotatable relative to the closure panel 122 of the vehicle 124. As a result, the detection system 120, or more particularly the radar transmit and receive antennas 44, 46 can be rotated and selectively orientated relative to the position of the liftgate 122 as will be further described in more detail below, to provide for custom coverage, for example when the liftgate 122 opens or closes, as well as avoiding blind spots during the movement of the liftgate 22 without the requirement of having multiple sensors with each dedicated areas of coverage.

Figure 15:
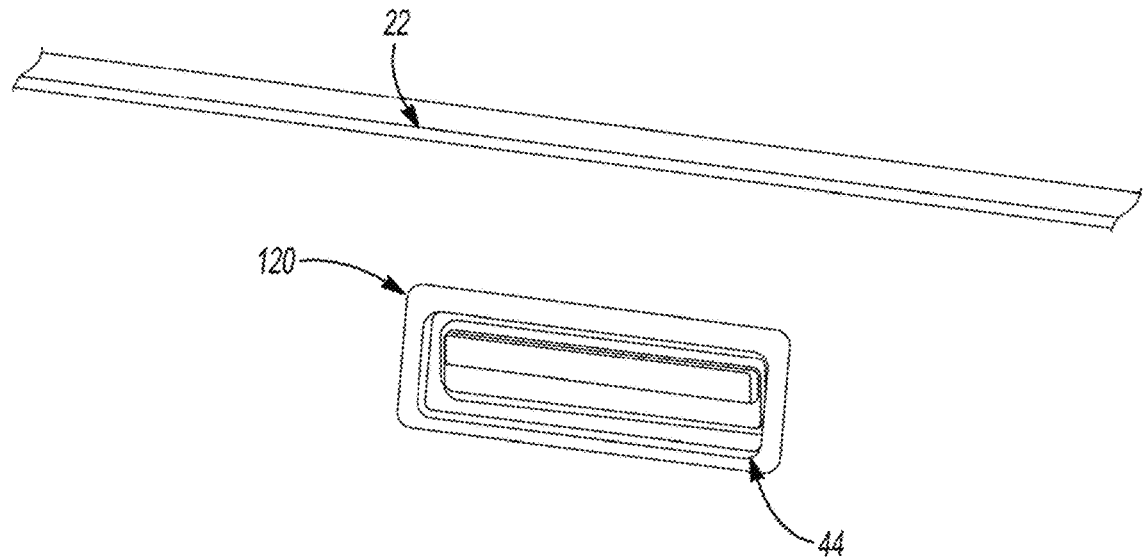
FIG. 15 is an exploded view of an alternate detection system of FIG. 1 according to aspects of the disclosure.
Figure 16:
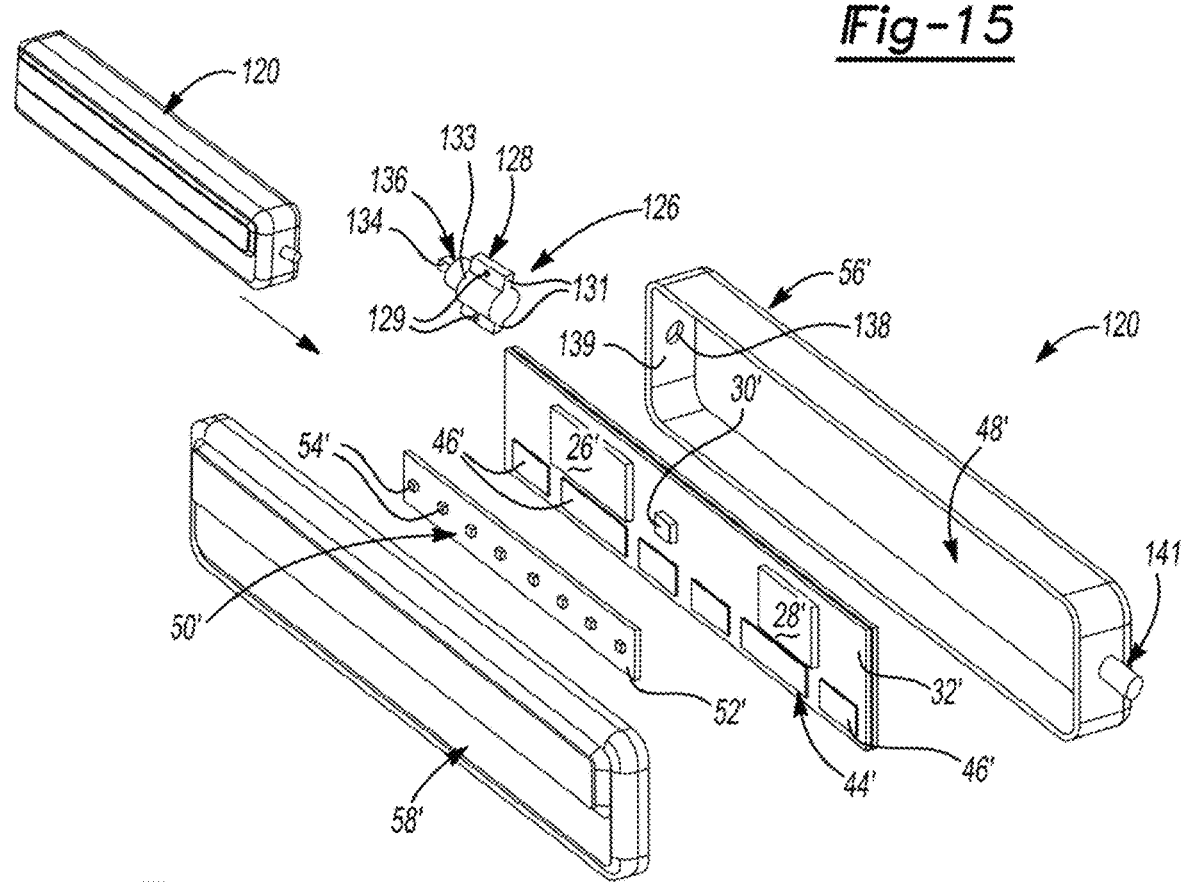
FIG. 16 is an exploded perspective view of the alternate detection system of FIG. 15 according to aspects of the disclosure.
Figure 17A:
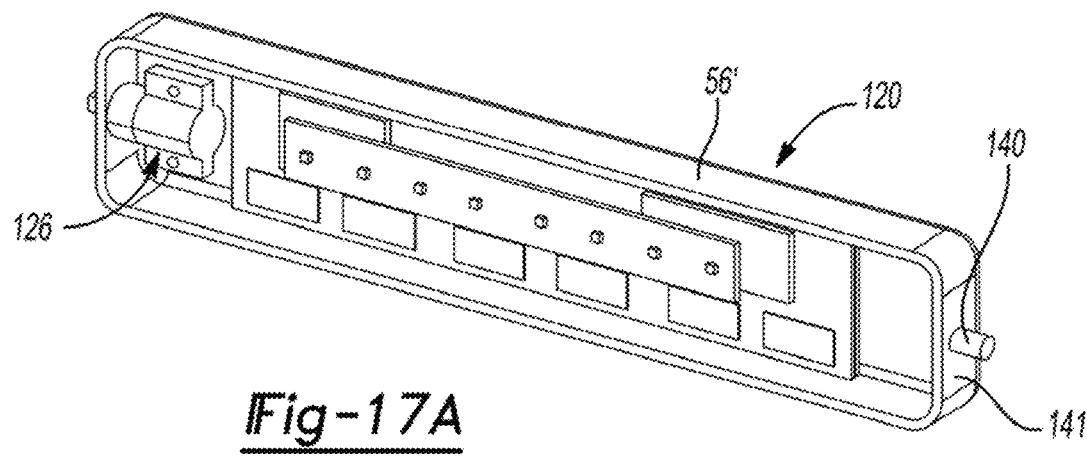
FIGS. 17A to 17C are perspective views of the alternate detection system of FIG. 15 according to aspects of the disclosure.
Figure 17B:
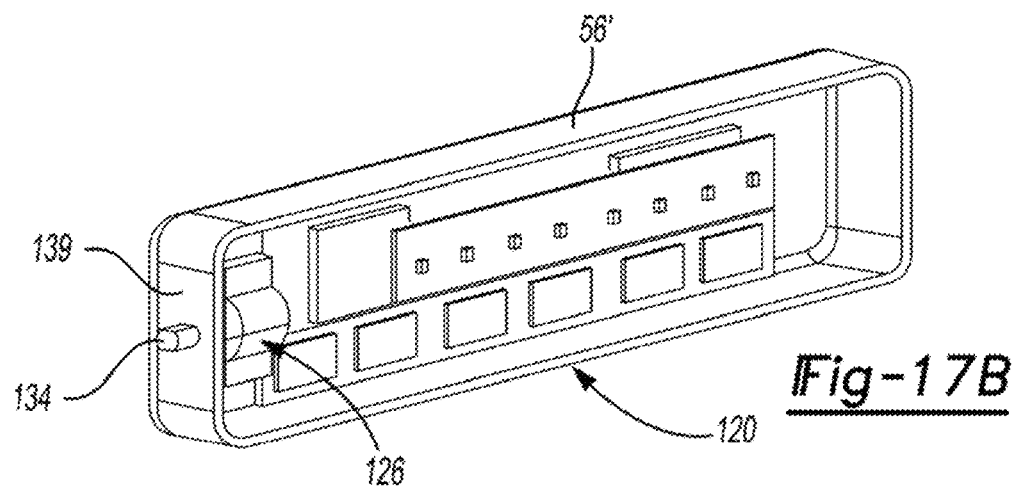
Figure 17C:
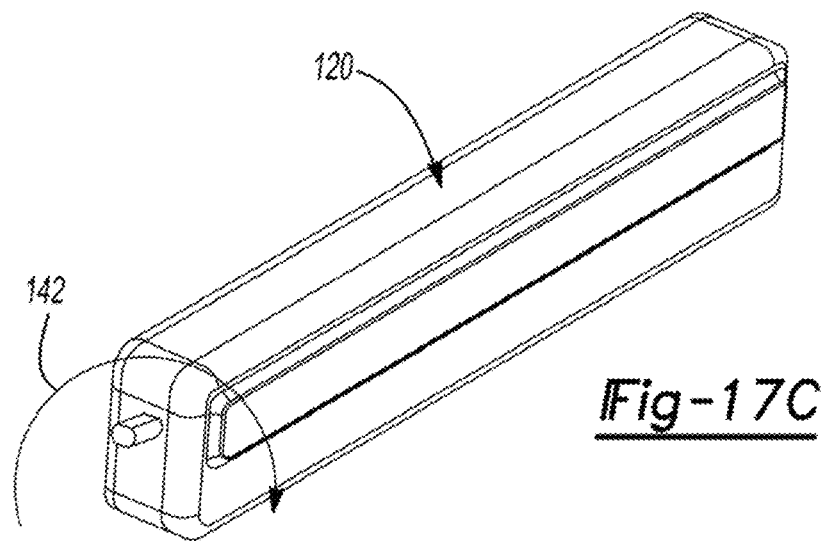
Figure 18:
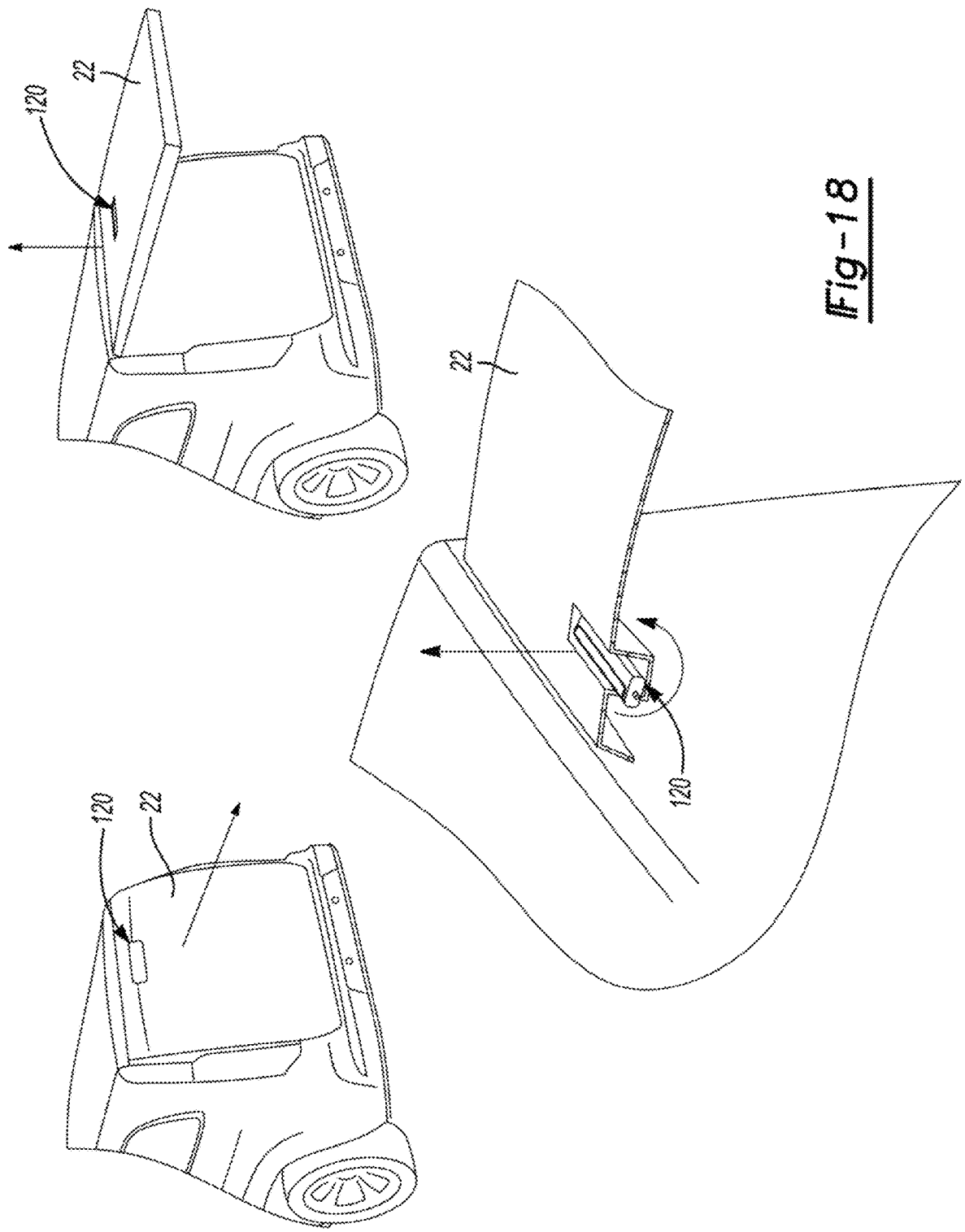
FIG. 18 illustrates detection of obstacles in a path of a liftgate in an outward obstacle detection mode of the rotatable detection system according to aspects of the disclosure.
Figure 19:
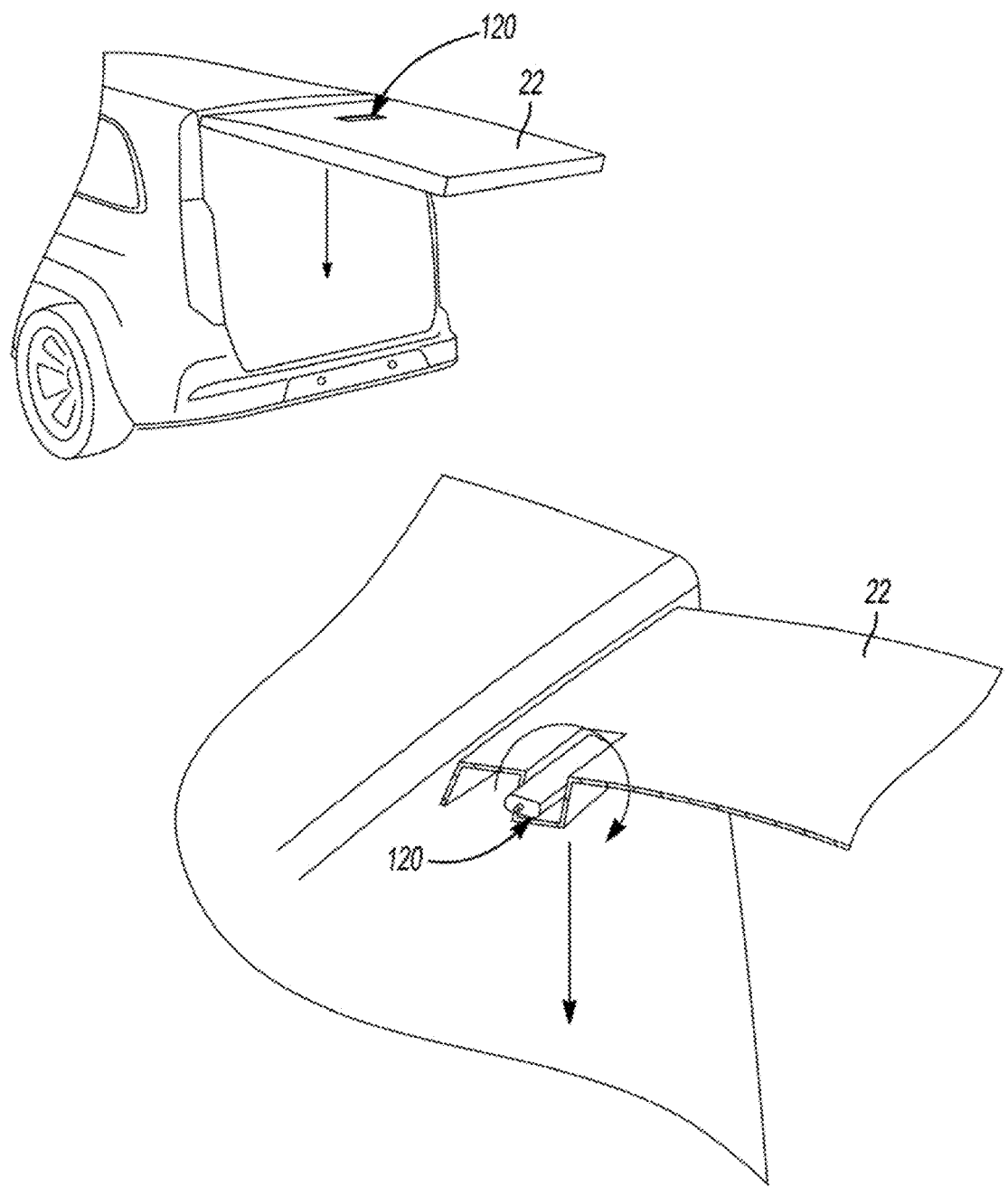
FIG. 19 illustrate detection of obstacles in a path of a liftgate in an inward obstacle detection mode of the detection system according to aspects of the disclosure.
Figure 20:
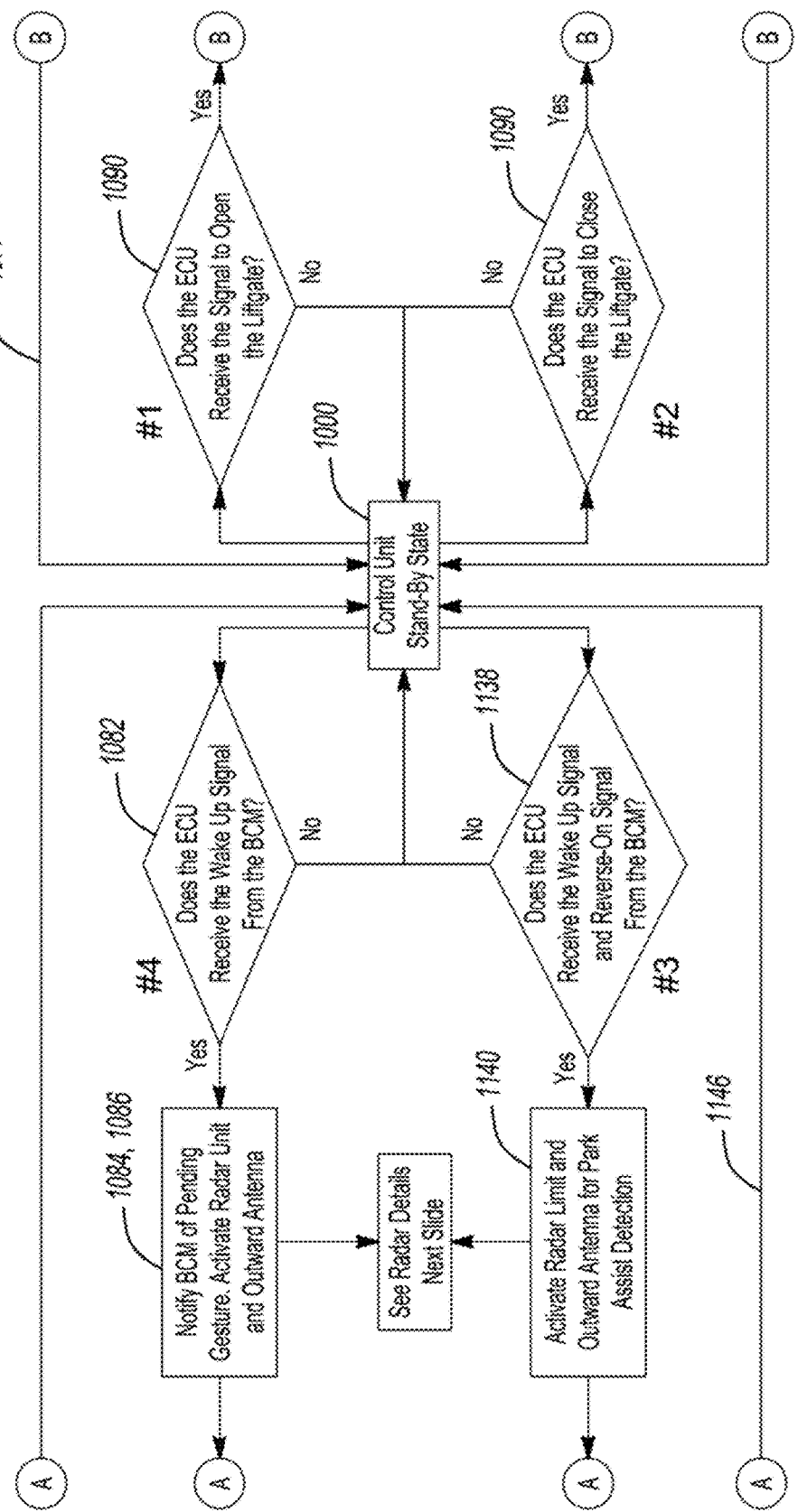
Figure 20A:
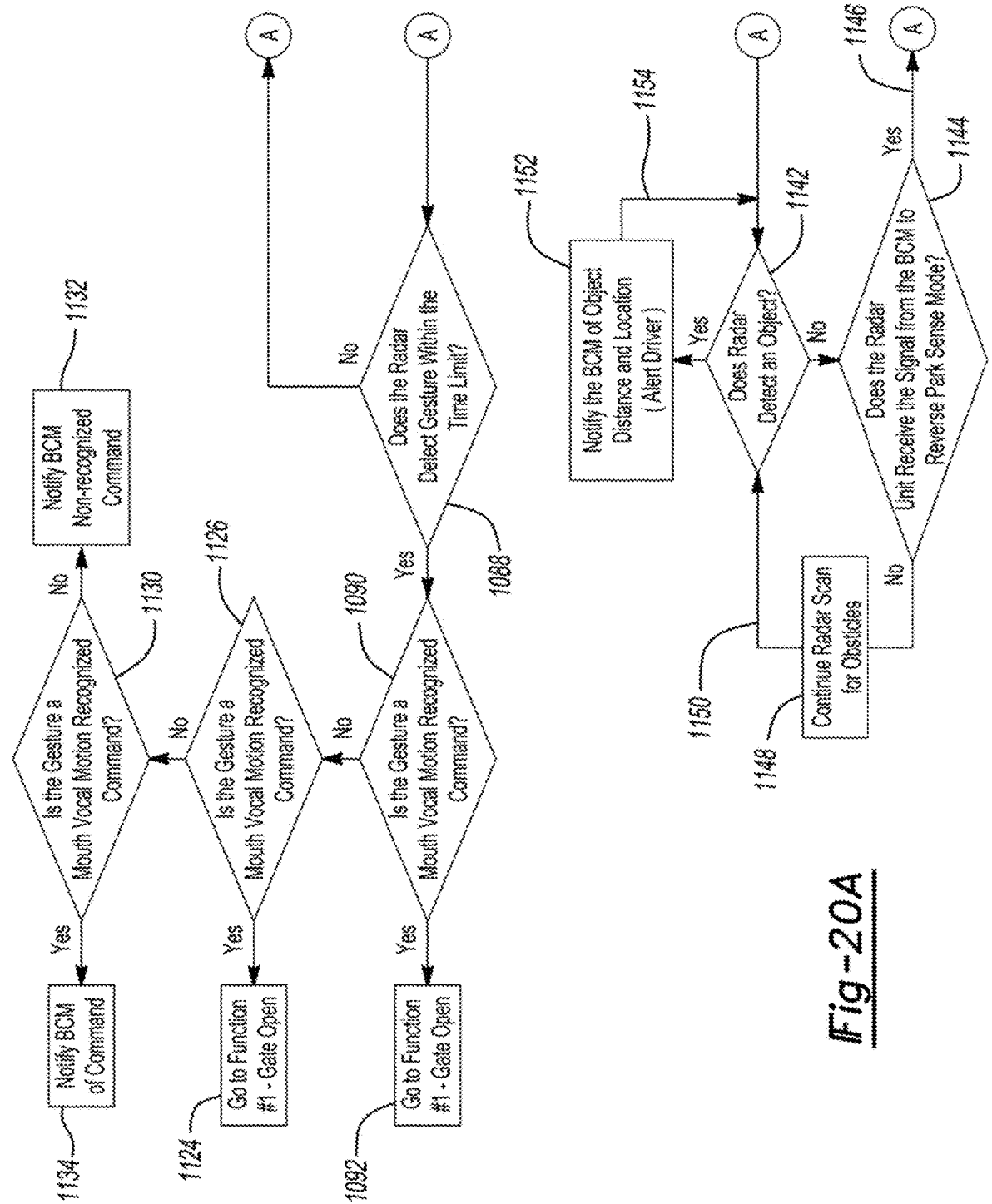
Figure 23:
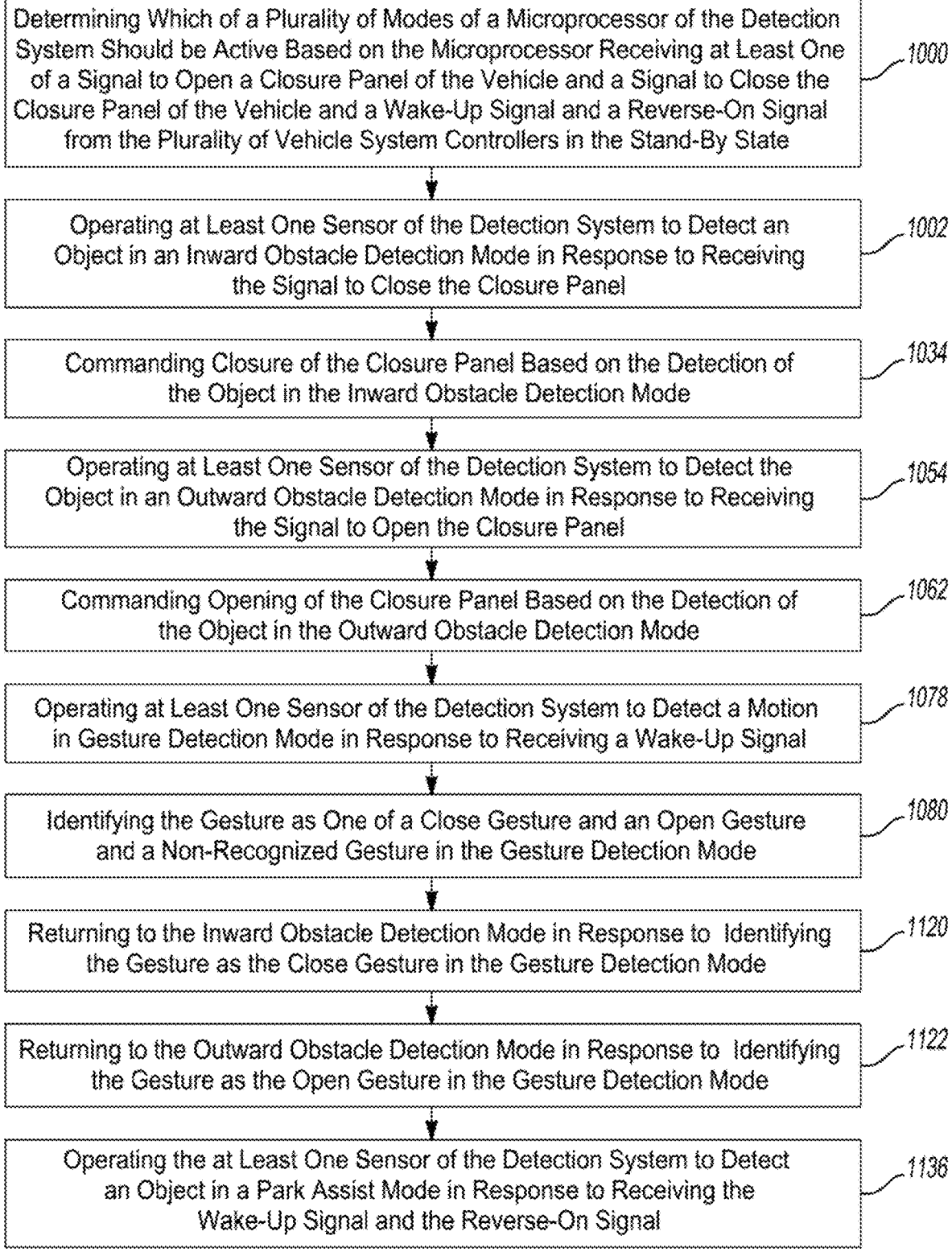

Now referring to FIGS. 15 to 19, the rotation of the detection system 120 providing for a rotatable orientation of the radar transmit and receive antennas 44, 46, can be controlled by a mechanism for orientating the sensor printed circuit board 32' as desired. With reference to FIGS. 15 and 16, the detection system 120 is illustratively shown as including a lighting subassembly 50' having a lighting printed circuit board 52' coupled to the sensor printed circuit board 32'. The lighting printed circuit board 52' includes a plurality of light emitting diodes 54' (LEDs) and is electrically coupled to the power supply unit 26' and the microprocessor 30' and the communication unit 28' for providing lighting associated with the closure panel 22 (e.g., CHMSL lighting). Additionally, the detection system 120 can include a housing 56', receivable within, receivable partially within, or positionable adjacent the aperture 59, and defining an opening 48' for receiving and enclosing the sensor printed circuit board 32' and the lighting printed circuit board 52'. A lens cover 58' is coupled to the housing 56' and extends over the lighting printed circuit board 52' for covering the opening 48' and allowing light from the plurality of light emitting diodes 54' of the lighting subassembly 50' to shine outwardly from the detection system 20'.

The detection system 120 further includes a motor assembly 126 illustratively shown as having a motor 128, such as a brushed or brushless electric motor, mounted within the housing 56', for example by using fasteners (not shown) engageable though fastener receiving apertures 129 provided on flanges 131 extending from the motor body 133, the fasteners engageable to the housing 56' for mounting the motor assembly 126 thereto. The motor assembly 126 further includes an output shaft 134 extending from the motor 128 via connection to a planetary gearbox 136. The output shaft 134 extends through a port 138 provided within a sidewall 139 of the housing 56' at one end of the housing 56', and the output shaft 134 is further secured to the liftgate 22. Provided at an opposite sidewall 141 of the housing 56', a projecting pin 140 is further provided to be pivotably coupled to the liftgate 22 at a point adjacent to the opposite side wall 141. Together, the secured connection of the output shaft 134 to the liftgate 122 and the pivotal connection of the projecting pin 140 rotatably supports the detection system 120 relative to the liftgate 122 while allowing a rotation 142 of the detection system 120 including the lighting subassembly 50', as a result of the activation of the motor 128. The activation of the motor 128 can be controlled by the microprocessor 30 based on the mode of operation in connection with the motor 128, for example by transmitting pulse width modulated control signals to impart a rotation in a desired direction and for a period of time. As illustratively shown in FIG. 15, the detection system 120 including the lighting subassembly 50' is received within a cavity 144 provided for in the liftgate 122, such that a rotation of the shaft 134 imparts a rotation of the housing 56' and correspondingly the sensor printed circuit board 32' so that the plurality of antennas 44', 46' can rotated relative to the liftgate 122 and oriented or positioned to provide for custom coverage, for example as the liftgate 122 opens or closes. Alternatively, the sensor printed circuit board 32' itself can be configured to rotate within a non-rotatable housing 56, for example sensor printed circuit board 32' can be enclosed within a Center High Mounted Stop Light (CHMSL) (or other vehicle module) disposed on the liftgate 22 (FIGS. 1, 2, 3A-3D) and configured to rotate within (for example by mounting the motor 128 to the housing 56' and securing the output shaft 134 to the sensor printed circuit board 32' to impart rotation of the sensor printed circuit board 32' while the Center High Mounted Stop Light (CHMSL) remains stationary relative to the liftgate 122. In an embodiment, the sensor printed circuit board 32' can be rotatable separately from the lighting printed circuit board 52' provided on its own distinct printed circuit board, which may be provided stationary relative to the housing 56'.

Thus, the disclosed detection system 20, 120 performs multiple sensing functions (i.e. obstacle detection, parking assists during reverse, and gesture recognition) using a single (or at least one) unit with the at least one sensor 44, 46. Consequently, a single detection system 20, 120 can replace multiple known detecting systems having dedicated and fixed orientated sensors, reducing cost, wiring and mounting complexity, and provide increased detection coverage areas without blind spots due to surrounding sheet metal and/or other intervening vehicle components. It is particularly useful for a liftgate 22, 122, which can provide for an elevated positioning of the detection system 20, 120 to increase the coverage area (i.e., the detection system 20, 120 is not just limited to coverage of an area below a bumper for a foot gesture recognition, but it can also cover farther distances away from the liftgate 22, 122 for park assist during reverse, for example). Since the detection system 20, 120 performs multiple functions, the detection system 20, 120 must be able to cover the regions relevant for the sensing function.

As discussed above, the disclosed detection system 20, 120 can be provided with the liftgate 22, 122 at an elevated vantage point for scanning and mapping the area in front of the liftgate 22, 122 and/or to the rear of the vehicle 24.

Integrating the detection system 20, 120 with an existing accessory, such as the Center High Mounted Stop Light, or license plate light/molding 23 above the license plate, can offer a sensing solution which uses existing mounting points on the vehicle 24, 124, and costs savings relative to packaging of the detection system 20, 120 (packaging of the accessory can be expanded to incorporate the detection system 20, 120), as well use existing electrical power supply connections (e.g., power harness wiring and electrical connections to other vehicle control systems) normally used to power and control a powered vehicle accessory, such as a lighting accessory. Also, the detection system 20, 120 may not be visible externally since no additional, specific, and non-traditional housing may be required, nor imperfect concealment processes (e.g. mounting a plastic cover to plug a radar transmissive port in the sheet metal of a closure panel, and further steps of painting and varnishing such a port to match with the surrounding closure panel). Additionally, since radar beams can pass through plastic, the detection system 20, 120 can be positioned behind the housing walls of the accessory, in a concealed manner. Providing a dedicated aperture in the liftgate 22 sheet metal can provide an unobstructed field of the view of the detection system 20, 120 over the range of travel of the liftgate 22 both of the outboard and inboard sides of the closure panel 22. To a passer-by, the liftgate 22, 122 will appear as a standard liftgate 22, 122 and the eye will not be drawn to the detection system 20, 120 and detract from the appearance of the vehicle 24, 124 such as is the case with the ultrasonic sensors appearing as dots on the surface of the vehicle 24, 124.

In accordance with an embodiment, there is provided a lighting assembly 100 for a closure panel 22 of a vehicle 24 having at least one vehicle system controller 102. The lighting assembly includes a housing 56 adapted to be mounted at least partially within an aperture 59 provided on the closure panel 22, a light source 54 housed within the housing 56 for providing lighting associated with the closure panel 22, at least one sensor 44 housed in the housing 56 for sensing at least one of an object and a motion adjacent the closure panel 22 and outputting data corresponding to at least one of an object and motion, the at least one sensor 44 configured to transmit at least one detection beam through the aperture 59 for sensing at least one of an object and a motion adjacent at least one of an outboard side E and an inboard side D of the closure panel 22, and a microprocessor 30 electrically coupled to the at least one vehicle system controller 102 and to the at least one sensor 44, and configured to operate the at least one sensor 44 to sense at least one of an object and a motion adjacent at least one of the outboard side E and the inboard side D of the closure panel 22 and communicate with the at least one vehicle system controller 102 to initiate a vehicle function in response to processing the data corresponding to the at least one of the object and the motion.

As best shown in FIGS. 20-23, a method of operating a detection system 20 in communication with a plurality of vehicle system controllers of a vehicle 24 is also provided. While the method is disclosed with reference to the first embodiment of the detection system 20, it should be understood that the method or variations thereof may be used with the second embodiment of the detection system 120, as well. The method begins with the step of 1000 determining which of a plurality of modes of a microprocessor 30 of the detection system 20 should be active based on the microprocessor 30 receiving at least one of a signal to open a closure panel 22 of the vehicle 24 and a signal to close the closure panel 22 of the vehicle 24 and a wake-up signal and a reverse-on signal from the plurality of vehicle 24 system controllers in a stand-by state.

The method continues by 1002 operating at least one sensor of the detection system 20 to detect an object in an inward obstacle detection mode in response to receiving the signal to close the closure panel 22. The step of 1002 operating the at least one sensor 44, 46 of the detection system 20 to detect the object in the inward obstacle detection mode in response to receiving the signal to close the closure panel 22 can include the step of 1004 entering the inward obstacle detection mode of the microprocessor 30 in response to receiving the signal to close the closure panel 22. The step of 1002 operating the at least one sensor 44, 46 of the detection system 20 to detect the object in the inward obstacle detection mode in response to receiving the signal to close the closure panel 22 can also include the steps of 1006 notifying a body control module of pending motion in the inward obstacle detection mode and 1008 activating a plurality of radar transmit antennas 44 and a plurality of radar receive antennas 46 of the detection system 20 disposed on an inward surface 40 of a sensor printed circuit board 32 of the detection system 20 to carry out a first radar sequence (FIG. 21) in the inward obstacle detection mode.

In more detail, the first radar detection sequence (FIG. 21) includes the step of 1010 mixing a plurality of transmit signals from the plurality of radar transmit antennas 44 and a plurality of receive signals from the plurality of radar receive antennas 46. Next, 1012 generating an intermediate frequency signal. The first radar sequence continues by 1014 filtering the intermediate frequency signal with a bandpass filter and 1016 transforming the filtered intermediate frequency signal with a fast Fourier transform (FFT). The next step of the first radar sequence is 1018 performing a peak search and object range detection. The first radar sequence continues with the steps of 1020 determining whether the object is in a critical range and 1022 continuing to command one of the opening 48 and the closure of the closure panel 22 and 1024 returning to the step of 1010 mixing the plurality of transmit signals from the plurality of radar transmit antennas 44 and the plurality of receive signals from the plurality of radar receive antennas 46 in response to the object not being in the critical range. The first radar sequence also includes 1026 enabling object tracking in response to the object being in the critical range and 1028 enabling speed detection and location detection in response to enabling object tracking. The first radar sequence continues with the steps of 1030 determining if movement of the closure panel 22 should be stopped and 1032 stopping movement of the closure panel 22 in response to determining that movement of the closure panel 22 should be stopped. The first radar sequence also includes 1033 returning to the step of enabling object tracking in response to determining that movement of the closure panel 22 should not be stopped.

The next step of the method is 1034 commanding closure of the closure panel 22 based on the detection of the object in the inward obstacle detection mode. In more detail, the step of 1034 commanding closure of the closure panel 22 based on the detection of the object in the inward obstacle detection mode can include the steps of 1036 commanding closure of the closure panel 22 using a power actuator in the inward obstacle detection mode and 1038 determining whether the plurality of radar receive antennas 46 disposed on the inward surface 40 of the sensor printed circuit board 32 of the detection system 20 detect the object in the inward obstacle detection mode. Additionally, the step of 1034 commanding closure of the closure panel 22 based on the detection of the object in the inward obstacle detection mode can also include 1040 commanding stoppage of closure of the closure panel 22 until a latch of the closure panel 22 has been closed in response to determining that the plurality of radar receive antennas 46 detect the object in the inward obstacle detection mode. Furthermore, the step of 1034 commanding closure of the closure panel 22 based on the detection of the object in the inward obstacle detection mode can also include the steps of 1042 determining whether the closure panel 22 is at a full closed position in response to determining that the plurality of radar receive antennas 46 do not detect the object in the inward obstacle detection mode and 1044 continuing to command closure of the closure panel 22 and 1046 scanning with the plurality of radar transmit antennas 44 and the plurality of radar receive antennas 46 of the detection system 20 disposed on the inward surface 40 of the sensor printed circuit board 32 of the detection system 20 in response to determining that the closure panel 22 is not at the full closed position in the inward obstacle detection mode. The step of 1034 commanding closure of the closure panel 22 based on the detection of the object in the inward obstacle detection mode can also include 1048 commanding stoppage of closure of the closure panel 22 and 1050 registering full closed position and 1052 returning to the stand-by state in response to determining that the closure panel 22 is at the full closed position in the inward obstacle detection mode.

The method proceeds with the step of 1054 operating the at least one sensor 44, 46 of the detection system 20 to detect the object in an outward obstacle detection mode in response to receiving the signal to open the closure panel 22. The step of 1054 operating the at least one sensor 44, 46 of the detection system 20 to detect an object in the outward obstacle detection mode in response to receiving the signal to open the closure panel 22 includes the steps of 1056 entering the outward obstacle detection mode of the microprocessor 30 in response to receiving the signal to open the closure panel 22 and 1058 notifying the body control module of pending motion in the outward obstacle detection mode. The step of 1054 operating the at least one sensor 44, 46 of the detection system 20 to detect an object in the outward obstacle detection mode in response to receiving the signal to open the closure panel 22 also includes the step of 1060 activating a plurality of radar transmit antennas 44 and a plurality of radar receive antennas 46 of the detection system 20 disposed on an outward surface 36 of the sensor printed circuit board 32 of the detection system 20 to carry out the first radar sequence (FIG. 21) in the outward obstacle detection mode.

The next step of the method is 1062 commanding opening 48 of the closure panel 22 based on the detection of the object in the outward obstacle detection mode. The step of 1062 commanding opening 48 of the closure panel 22 based on the detection of the object in the outward obstacle detection mode includes the steps of 1064 commanding opening 48 of the closure panel 22 using the power actuator in the outward obstacle detection mode and 1066 determining whether the plurality of radar receive antennas 46 disposed on the outward surface 36 of the sensor printed circuit board 32 of the detection system 20 detect the object in the outward obstacle detection mode. The step of 1062 commanding opening 48 of the closure panel 22 based on the detection of the object in the outward obstacle detection mode also includes the steps of 1068 commanding stoppage of opening 48 of the closure panel 22 until the latch of the closure panel 22 has been closed in response to determining that the plurality of radar receive antennas 46 detect the object in the outward obstacle detection mode and 1070 determining whether the closure panel 22 is at a full open position in response to determining that the plurality of radar receive antennas 46 do not detect the object in the outward obstacle detection mode. In addition, the step of 1062 commanding opening 48 of the closure panel 22 based on the detection of the object in the outward obstacle detection mode includes 1072 continuing to command opening 48 of the closure panel 22 and 1074 scanning with the plurality of radar transmit antennas 44 and the plurality of radar receive antennas 46 of the detection system 20 disposed on the outward surface 36 of the sensor printed circuit board 32 of the detection system 20 in response to determining that the closure panel 22 is not at the full open position in the outward obstacle detection mode. Furthermore, the step of 1062 commanding opening 48 of the closure panel 22 based on the detection of the object in the outward obstacle detection mode includes 1075 commanding stoppage of opening 48 of the closure panel 22 and 1076 registering full closed position and 1077 returning to the stand-by state in response to determining that the closure panel 22 is at the full closed position in the outward obstacle detection mode.

The method also includes the step of 1078 operating the at least one sensor 44, 46 of the detection system 20 to detect a motion in a gesture detection mode in response to receiving the wake-up signal. The method continues by 1080 identifying the gesture as one of a close gesture and an open gesture and a non-recognized gesture in the gesture detection mode.

The steps of 1078 operating the at least one sensor 44, 46 of the detection system 20 to detect the motion in a gesture detection mode in response to receiving a wake-up signal and 1080 identifying the gesture as one of the close gesture and the open gesture and the non-recognized gesture in the gesture detection mode include the steps of 1082 entering the gesture detection mode of the microprocessor 30 in response to receiving the wake-up signal and 1084 notifying the body control module of pending motion in the gesture detection mode. Next, 1086 activating the plurality of radar transmit antennas 44 and the plurality of radar receive antennas 46 of the detection system 20 disposed on the outward surface 36 of the sensor printed circuit board 32 of the detection system 20 to carry out a second radar sequence (FIG. 22) in the gesture detection mode. Then, the next step is 1088 determining whether the plurality of radar receive antennas 46 disposed on the outward surface 36 of the sensor printed circuit board 32 of the detection system 20 detect the gesture within a predetermined time limit in the gesture recognition mode. The steps of 1078 operating the at least one sensor 44, 46 of the detection system 20 to detect the motion in a gesture detection mode in response to receiving a wake-up signal and 1080 identifying the gesture as one of the close gesture and the open gesture and the non-recognized gesture in the gesture detection mode include the steps of 1090 determining whether the gesture is the open gesture in response to determining that the plurality of radar receive antennas 46 detect the gesture within the predetermined time limit in the gesture recognition mode and 1092 returning to the stand-by state in response to determining that the plurality of radar receive antennas 46 do not detect the gesture within the predetermined time limit in the gesture recognition mode.

In more detail, the second radar detection sequence (FIG. 22) includes the step of 1094 mixing a plurality of transmit signals from the plurality of radar transmit antennas 44 and a plurality of receive signals from the plurality of radar receive antennas 46. Next, 1096 generating an intermediate frequency signal. The second radar sequence continues by 1098 filtering the intermediate frequency signal with a bandpass filter and 1100 transforming the filtered intermediate frequency signal with a fast Fourier transform. The next step of the second radar sequence is 1102 performing a peak search and object range detection. The second radar sequence continues with the steps of 1104 determining whether the object is in a critical range and 1106 continuing to command one of the opening 48 and the closure of the closure panel 22 and 1108 returning to the step of mixing the plurality of transmit signals from the plurality of radar transmit antennas 44 and the plurality of receive signals from the plurality of radar receive antennas 46 in response to the object not being in the critical range. The second radar sequence also includes 1110 enabling object gesture tracking in response to the object being in the critical range and 1112 enabling speed detection and location detection in response to enabling object gesture tracking. The second radar sequence continues with the steps of 1114 determining whether the gesture is one of a plurality of recognized commands within a predetermined time limit and 1116 signaling the body control module to perform a function associated with the recognized command in response to determining that the gesture is one of the plurality of recognized commands. The second radar sequence also includes the step of 1118 returning to the step of enabling object gesture tracking in response to determining that the gesture is not one of the plurality of recognized commands.

The next step of the method is 1120 returning to the inward obstacle detection mode in response to identifying the gesture as the close gesture in the gesture detection mode. The method then includes the step of 1122 returning to the outward obstacle detection mode in response to identifying the gesture as the open gesture in the gesture detection mode. The step of 1120 returning to the outward obstacle detection mode in response to identifying the gesture as the close gesture in the gesture detection mode includes the steps of 1124 returning to the step of entering the outward obstacle detection mode in response to determining that the gesture is the open gesture in the gesture recognition mode and 1126 determining whether the gesture is the close gesture in response to determining that the gesture is not the open gesture in the gesture recognition mode. The step of 1122 returning to the inward obstacle detection mode in response to identifying the gesture as the close gesture in the gesture detection mode includes the step of 1128 returning to the step of entering the inward obstacle detection mode in response to determining that the gesture is the close gesture in the gesture recognition mode.

The method continues by 1130 determining whether the gesture is one of a plurality of recognized commands in response to determining that the gesture is not the close command in the gesture recognition mode. The next step of the method is 1132 notifying the body control module of one of plurality of the recognized commands in response to determining that the gesture is one of the plurality of recognized commands in the gesture recognition mode. The method also includes the step of 1134 notifying the body control module of a non-recognized command in response to determining that the gesture is not one of the plurality of recognized commands in the gesture recognition mode.

The method additionally includes the step of 1136 operating the at least one sensor 44, 46 of the detection system 20 to detect an object in a park assist mode in response to receiving the wake-up signal and the reverse-on signal. More specifically, the step of 1136 operating the at least one sensor 44, 46 of the detection system 20 to detect the object in the park assist mode in response to receiving the wake-up signal and the reverse-on signal includes the steps of 1138 entering the park assist mode of the microprocessor 30 in response to receiving the wake-up signal and the reverse-on signal and 1140 activating the plurality of radar transmit antennas 44 and the plurality of radar receive antennas 46 of the detection system 20 disposed on the outward surface 36 of the sensor printed circuit board 32 of the detection system 20 to carry out the first radar sequence in the park assist mode. Next, 1142 determining whether the plurality of radar receive antennas 46 disposed on the outward surface 36 of the sensor printed circuit board 32 of the detection system 20 detect the object in the park assist mode. Then, 1144 determining whether a reverse-off signal has been received in response to determining that the plurality of radar receive antennas 46 do not detect the object in the park assist mode. The step of 1136 operating the at least one sensor 44, 46 of the detection system 20 to detect the object in the park assist mode in response to receiving the wake-up signal and the reverse-on signal also includes the steps of 1146 returning to the stand-by state in response to determining that the reverse-off signal has been received in the park assist mode and 1148 continuing to scan with the plurality of radar transmit antennas 44 and the plurality of radar receive antennas 46 of the detection system 20 disposed on the outward surface 36 of the sensor printed circuit board 32 of the detection system 20 in response to determining that no reverse-off signal has been received in the park assist mode. Additionally, the step of 1136 operating the at least one sensor 44, 46 of the detection system 20 to detect the object in the park assist mode in response to receiving the wake-up signal and the reverse-on signal includes the step of 1150 returning to the step of determining whether the plurality of radar receive antennas 46 disposed on the outward surface 36 of the sensor printed circuit board 32 of the detection system 20 detect the object in the park assist mode in response to determining that no reverse-off signal has been received in the park assist mode. The step of 1136 operating the at least one sensor 44, 46 of the detection system 20 to detect the object in the park assist mode in response to receiving the wake-up signal and the reverse-on signal can also include the step of 1152 notifying the body control module of an object distance and location and 1154 returning to the step of determining whether the plurality of radar receive antennas 46 disposed on the outward surface 36 of the sensor printed circuit board 32 of the detection system 20 detect the object in the park assist mode in response to determining that the plurality of radar receive antennas 46 detect the object in the park assist mode.

The method described hereinabove can further include the step of rotating the sensor printed circuit board 32 of the detection system 20 in correlation to the position of the liftgate 22. The method described hereinabove can further include the step of rotating the sensor printed circuit board 32 of the detection system 20 in correlation to the active mode of a microprocessor 30 of the detection system 20 i.e. park assist mode, inward obstacle detection mode, outward obstacle detection mode, gesture recognition mode.

Figure 24:
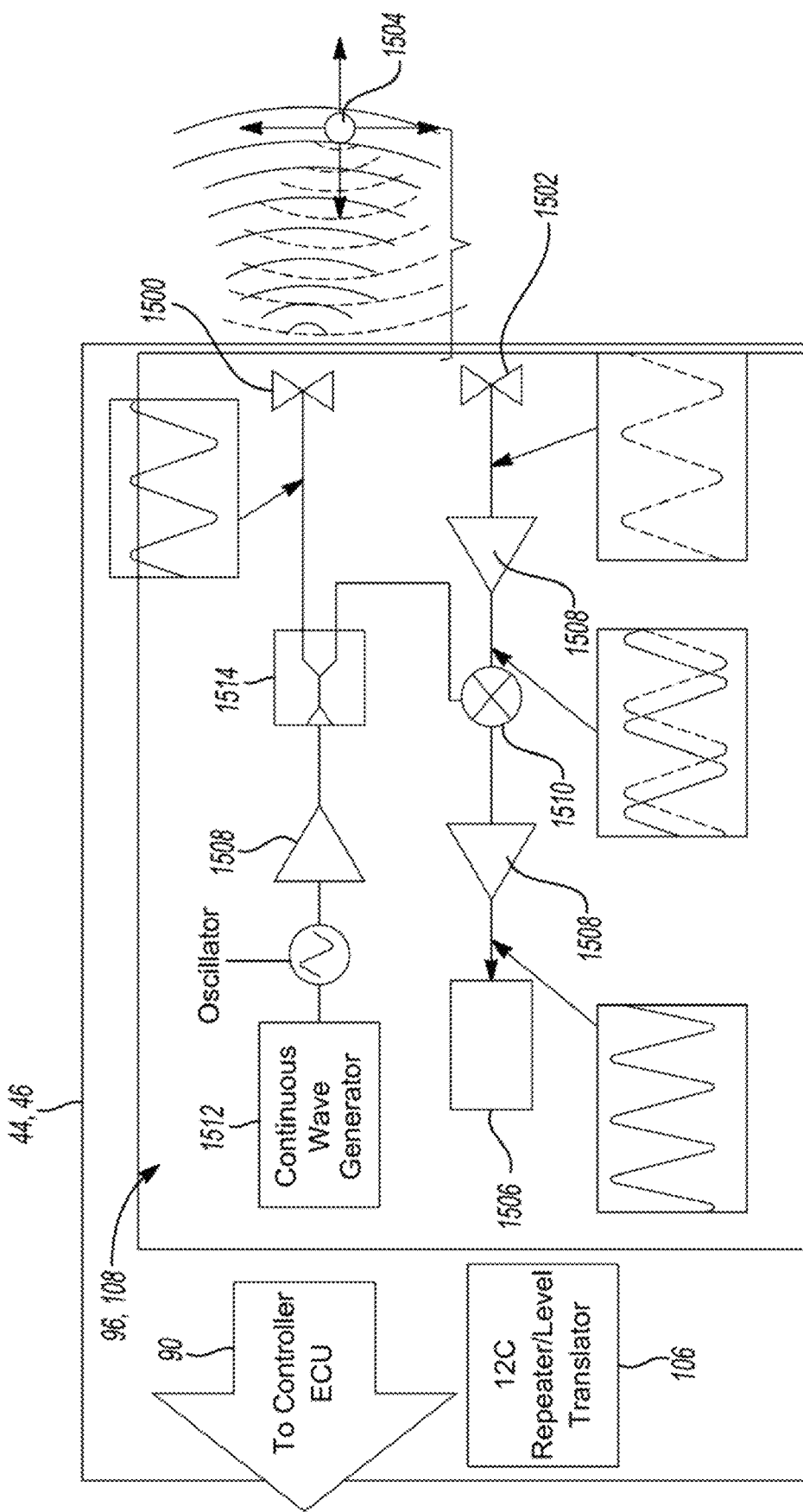
FIGS. 24 to 26 are block diagrams illustrating radar based non-contact obstacle and gesture detection sensors for a motor vehicle according to aspects of the disclosure.
Figure 25:
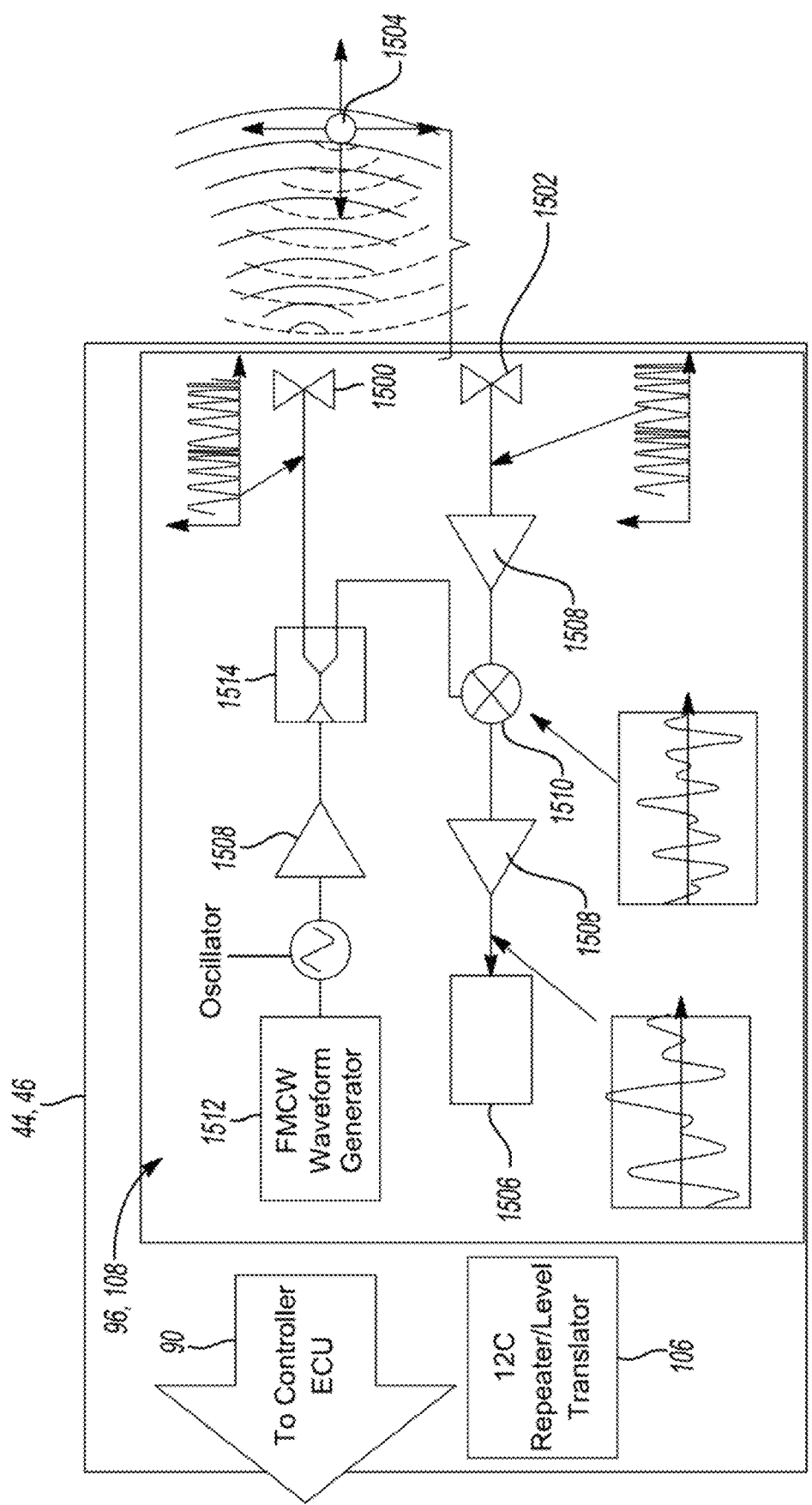
Figure 26:
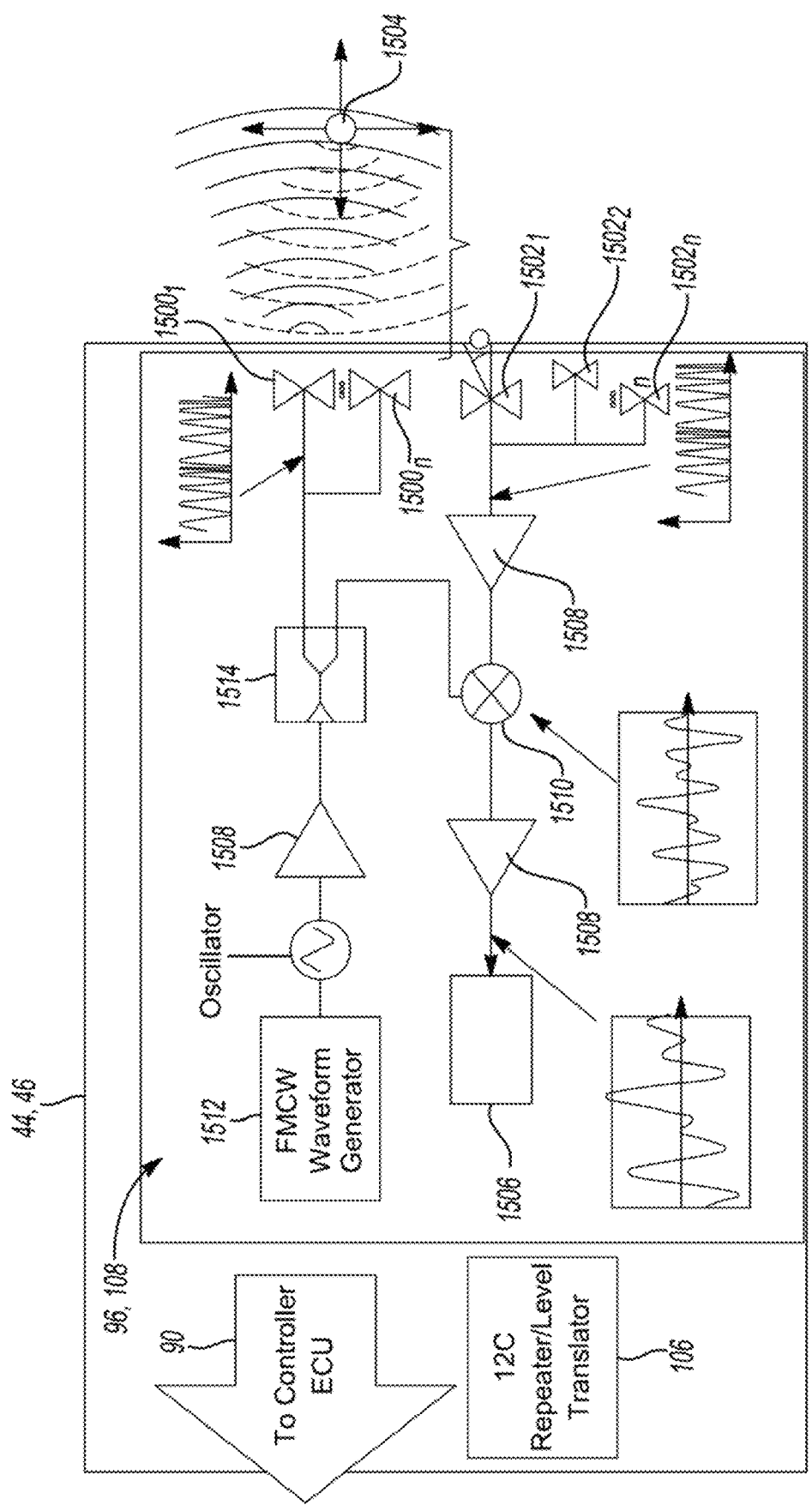

Now referring to FIGS. 24 to 26, the at least one sensor 44, 46 of the detection system 20 (or detection system 120) may be configured to transmit and detect radio waves. The at least one sensor 44, 46 of the detection system 20 can be configured to emit continuously modulated radiation, ultra-wideband radiation, or sub-millimeter-frequency radiation (e.g., frequencies forming part of the ISM frequency band about 24 GHz, or the 60 GHz, or the 80 Hz frequency band as examples, but other ranges are also contemplated). For example, the at least one sensor 44, 46 of the detection system 20 may be configured to emit continuously emitted radiation by the radar emitting element 1500, such as an antenna, or continuous wave (CW) radar, known in the art to use Doppler radar techniques, which can be employed in the radar based sensor as illustrated in FIG. 24. A modulated emitted radiation by the radar emitting element 1500, or frequency modulated continuous wave (FMCW) radar, also known in the art to use Doppler radar techniques, may also be employed in the radar based detection sensor as illustrated in FIG. 25. Also, the sensor may be configured for pulsed time-of-flight radar. The at least one sensor 44, 46 of the detection system 20, 82 includes one or more receive elements 1502, such as antenna(s), for receiving the reflections of the transmitted radar waves, which reflect off of an object 1504. The radar emitting element 1500 may be integrated into the sensor printed circuit board 32, or integrated into a radar chip affixed to the sensor printed circuit board 32.

The at least one sensor 44, 46 may be configured to emit and detect continuous wave (CW) radar, as is illustratively shown in FIG. 24 with the radar sensor including one transmit antenna 1500 and one receive antenna 1502. With such a configuration, the radar sensor is operable to detect a speed/velocity of the object 1504 using the Doppler Radar principles (i.e. processing by the main electronic control unit 90 or a dedicated local application specific radar signal processor 1506 of the received reflected CW radar signal to determine frequency shifts of an emitted continuous radiation wave indicative of the speed of the object 1504). The radar emitting element 1500 can be also configured to emit frequency modulated continuous wave (FMCW) radar, as is illustratively shown in FIG. 25, with the radar sensor including one transmit antenna 1500 and one receive antenna 1502. With such a configuration, the radar sensor is operable to detect a motion of the obstacle 1504 using the Frequency Modulated Radar techniques (i.e. processing by a signal processor 1506 or main electronic control unit 90 of the reflected FMCW radar signal to determine frequency shifts indicative of the speed (Doppler frequency) and distance (beat frequency) of the object 1504). Alternatively the FMCW radar sensor can be configured to include at least two receive antennas $1502_1$, $1502_2$, to $1502_n$ forming an antenna array, as shown in FIG. 26. Also, multiple transmit antennas $1500_n$ may be provided. The signal processor 1506 is illustrated disposed in communication with the antenna element(s) 1502 through signal processing elements such as high/low gain signal amplifiers 1508, a mixer 1510 configured to mix the received signal with the transmitted signal generated by a waveform generator 1512 as received from a splitter 1514 for processing the received reflections (i.e. the signal processor 1506 or main electronic control unit 24 can be configured execute instructions stored in a memory to perform calculations on the received reflection and transmitted radiation signals (i.e. mixed signals) to implement the various detection techniques or algorithms e.g. CW Radar, FMCW Radar, time of flight) within the intermediate radar field to provide data for determining the motion, speed, distance, positions and direction of the object. For example, the signal processor 1506 or main electronic control unit 90 can be configured to process the received reflection to determine a Doppler shift for calculating the speed/velocity of the object 1504, or a frequency shift for calculating the distance and speed of the object 1504.

Figure 27:
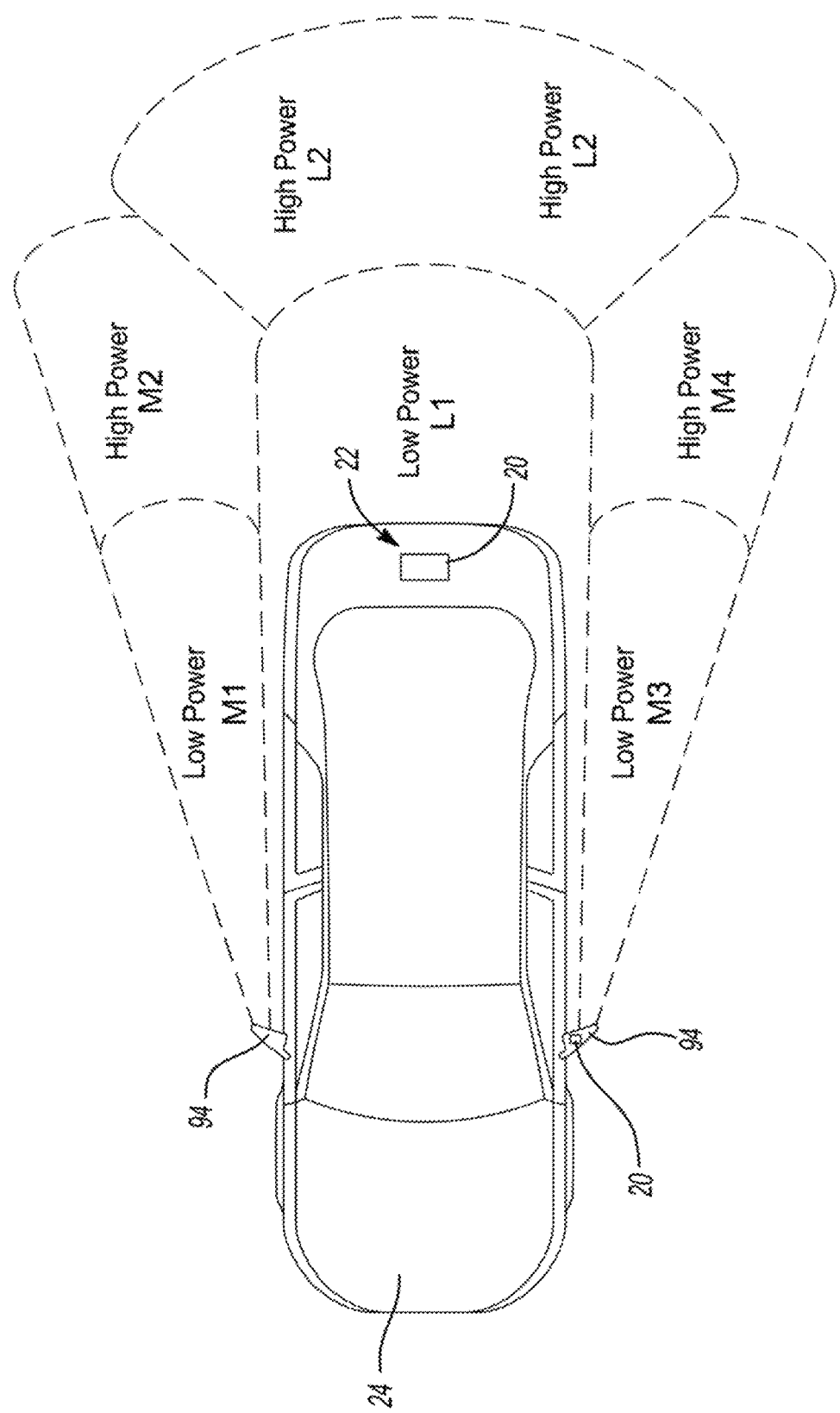
FIG. 27 illustrate different detection zones of a detection system positioned on a rear vehicle closure panel and a detection system disposed on a side vehicle closure panel each having detection zones delimited by their operating power.

In accordance with another embodiment and with reference to FIG. 27, the detection system 20, 120 can be further integrated with another existing accessory, such as the side view mirror 94 (e.g., behind any mirrored surface) which can expand the detection zone of the detection system 20, 120 to include zones adjacent to the vehicle 24 and rearward the vehicle 24. In an embodiment, the detection system 20, 120 integrated with another existing accessory, such as the side view mirror 94, can be configured for a detection zone to detect objects or motion adjacent and/or rearward the rear closure panel 22, for example of a user making an open or close gesture adjacent the rear closure panel 22 outside the detection zone A, but within detection zone B, or C. For example, the detection system 20, 120 can be integrated within the side view mirror 94 (i.e., at least one additional sensor 44, 44', 46, 46') can provide for a coverage detection zone M on either sides of the vehicle 24, while the detection system 20, 120 further provided with the liftgate 22, 122 can provide the coverage detection zone L. When operating together, the detection zones of the detection system 20, 120 can be increased providing detection of objects in the zones L and M when the vehicle 24 is operating in different modes. For example, when the vehicle 24 is operating in a park assist mode whereby the vehicle 24 is moving in a reverse direction (e.g., transmission of the vehicle is in reverse gearing). The detection system 20, 120 can therefore provide detection of objects within these zones L and M, such as parked cars, bystanders, or other objects such as pile cones, posts, curbs, when the vehicle is reversing and alert a vehicle control system of a detected object which may impact the vehicle 24 if a correction action e.g. stopping the reversal of the vehicle 24, is not undertaken. Such a vehicle control system can include an audio or visual alert system internal the vehicle cabin to alert the driver of the object, a brake control system to apply the brakes to stop the vehicle before it impacts the object, an autonomous vehicle system, such as an advance driver-assistance system, or an autonomous vehicle control system which controls the throttle, steering and braking system.

Based on the operating mode of the vehicle, the detection system 20, 120 can operate at different detection zones. For example, when the vehicle is in the park assist mode, the at least one sensor 44, 46 can be operated to detection an object or motion within a first detection zone M1, M3, and L1 being illustratively between 0 and 4 meters from the at least one sensor 44, 46. Such as limitation in the detection zone will allow processing of sensor data relevant to the mode of operation of the vehicle to provide useful data to the vehicle control systems. For example, an object and motion at a distance of 15 meters may not be relevant for a park assist operation where movement of the vehicle into a parked position involves a displacement of 5 meters either rearwardly or laterally.

As best shown in FIGS. 28-31, a method of operating a detection system 20 in communication with a plurality of vehicle system controllers of a vehicle 24 based on the operating mode of the vehicle, with the detection system 20, 120 configured to operate at different detection zones is also provided. While the method is disclosed with reference to the third embodiment of the detection system 20, it should be understood that the method or variations thereof may be used with the first embodiment of the detection system 20 or the second embodiment of the detection system 120, as well.

The method begins with the step of 1000 (FIG. 23) determining which of a plurality of modes of a microprocessor 30 of the detection system 20 should be active based on the microprocessor 30 receiving at least one of a signal to open a closure panel 22 of the vehicle 24 and a signal to close the closure panel 22 of the vehicle 24 and a wake-up signal and a reverse-on signal and a drive signal and a park signal from the plurality of vehicle 24 system controllers in a stand-by state.

In more detail, and with reference to FIG. 27, when the forward driving blindspot detection mode is active based on the microprocessor 30 receiving a drive signal, the first radar detection sequence includes the step of 2708 activating the radar sensors in the side view mirror 94 and the liftgate to monitor all the detection zones, e.g. zones L1, L2, M1, M2, M3, M4, 2710 mixing a plurality of transmit signals from the plurality of radar transmit antennas 44 and a plurality of receive signals from the plurality of radar receive antennas 46. Next, 2712 generating an intermediate frequency signal. The first radar sequence continues by 2714 filtering the intermediate frequency signal with a bandpass filter and 2716 transforming the filtered intermediate frequency signal with a fast Fourier transform (FFT). The next step of the first radar sequence is 2718 performing a peak search and object range detection. The first radar sequence continues with the steps of 2720 determining whether the object is in zone M1 or M3 and 2721 continuing scanning and returning to the step of 2710 mixing the plurality of transmit signals from the plurality of radar transmit antennas 44 and the plurality of receive signals from the plurality of radar receive antennas 46 in response to the object not being in zone M1 or M3. The first radar sequence also includes 2726 enabling object tracking in response to the object being in zone M1 or M3 and 2728-1 enabling speed detection and 2728-2 location detection in response to enabling object tracking. The first radar sequence continues with the steps of 2730 determining if the object is in the blindspot of the driver e.g. in zone M1 or M3. The first radar sequence also includes returning to the step of 2730 enabling object tracking in response to determining that the object is not in the blindspot of the driver e.g. in zone M1 or M3. The first radar sequence also includes 2732 notifying the driver of an object that is in the blindspot of the driver e.g. in zone M1 or M3 in response to determining that an object is in the blindspot of the driver e.g. in zone M1 or M3.

Figure 28:
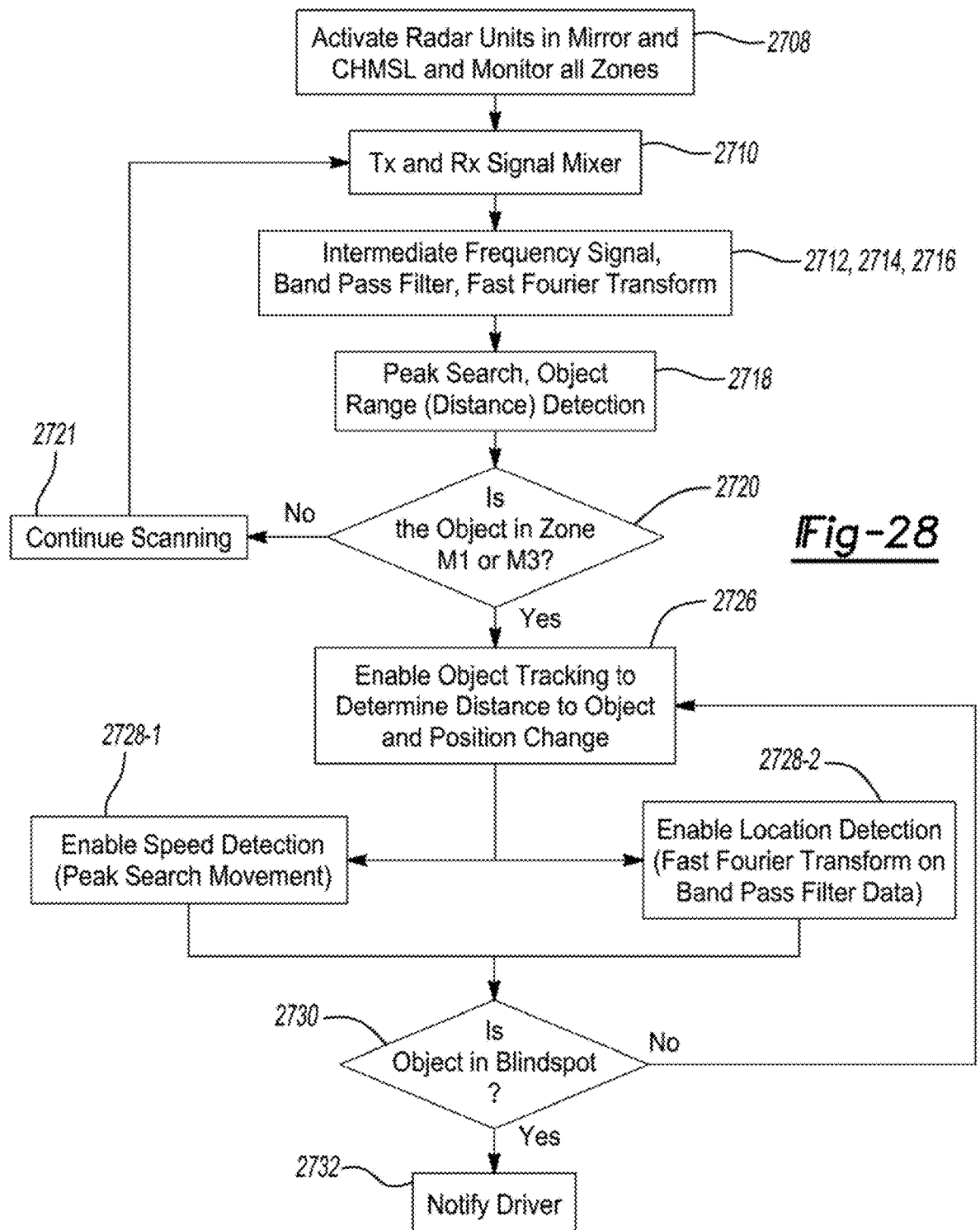
FIGS. 28 to 31 illustrate steps of methods of operating a detection system according to aspects of the disclosure.
Figure 29:
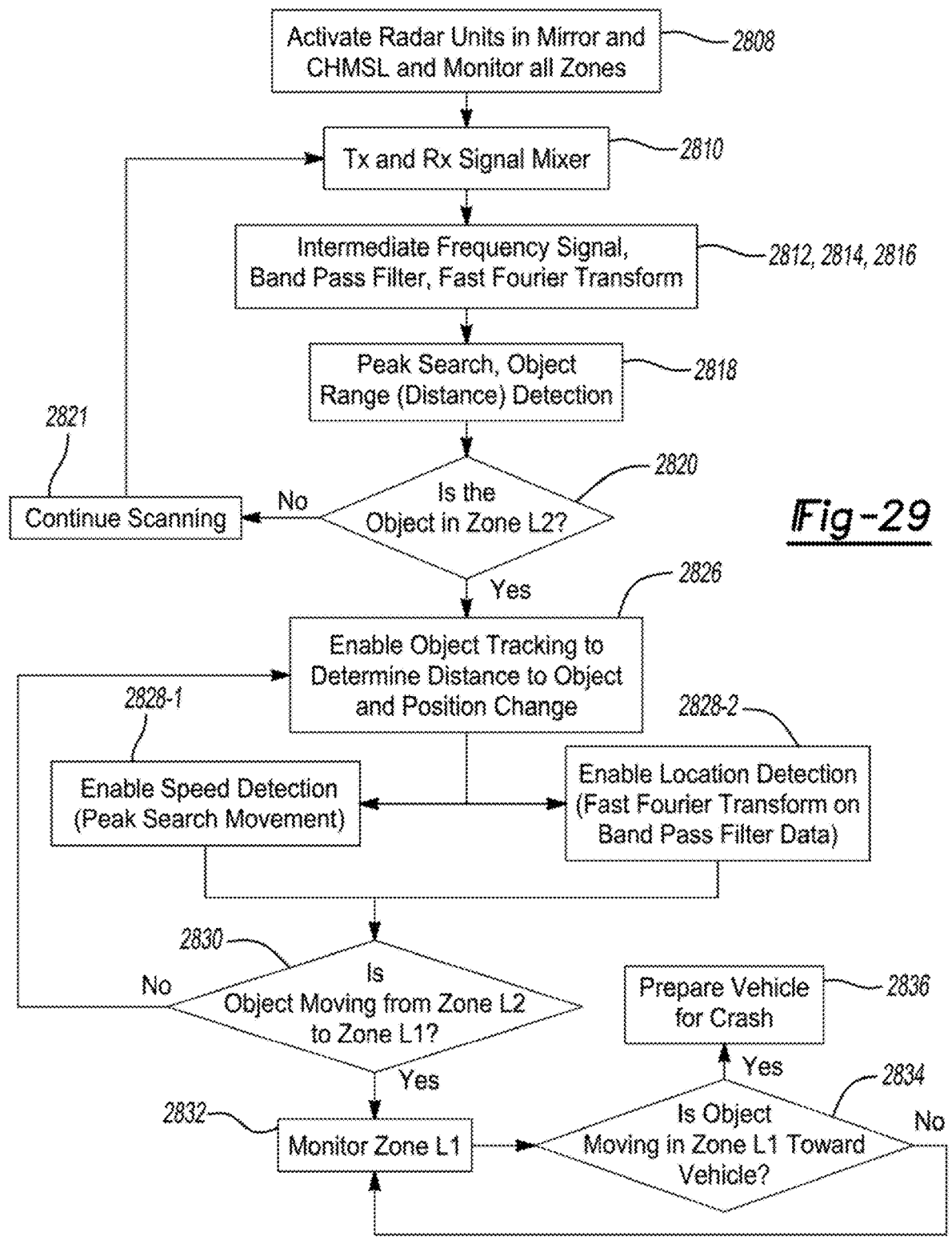

In more detail, and with reference to FIG. 28, when the forward driving rear end crash imminent mode is active based on the microprocessor 30 receiving a drive signal, the first radar detection sequence includes the step of 2808 activating the radar sensors in the side view mirror 94 and the radar sensors in the liftgate 22 to monitor all the detection zones, e.g. zones L1, L2, M1, M2, M3, M4, 2810 mixing a plurality of transmit signals from the plurality of radar transmit antennas 44 and a plurality of receive signals from the plurality of radar receive antennas 46. Next, 2812 generating an intermediate frequency signal. The first radar sequence continues by 2814 filtering the intermediate frequency signal with a bandpass filter and 2816 transforming the filtered intermediate frequency signal with a fast Fourier transform (FFT). The next step of the first radar sequence is 2818 performing a peak search and object range detection. The first radar sequence continues with the steps of 2820 determining whether the object is in zone L2 and 2821 continuing scanning and returning to the step of 2810 mixing the plurality of transmit signals from the plurality of radar transmit antennas 44 and the plurality of receive signals from the plurality of radar receive antennas 46 in response to the object not being in zone L2. The first radar sequence also includes 2826 enabling object tracking in response to the object being in zone L2 and 2828-1 enabling speed detection and 2828-2 location detection in response to enabling object tracking. The first radar sequence continues with the steps of 2830 determining if the object moving from zone L2 to L1, indicating it is approaching the vehicle. The first radar sequence also includes returning to the step of 2826 enabling object tracking in response to determining that the object is not moving from zone L2 to L3. The first radar sequence also includes 2832 monitoring zone L1 in response to determining that the object is moving from zone L2 to L1. The first radar sequence continues with the steps of 2834 determining if the object moving in zone L1 towards the vehicle, indicating it is continuing to approach the vehicle. The first radar sequence also includes returning to the step of 2832 monitoring zone L1 in response to determining that the object is not moving from moving in zone L1 towards the vehicle. The first radar sequence continues with the steps of 2836 preparing the vehicle for crash, which may include altering the driver, or activating a vehicle system e.g. locking seatbelts, deploying airbags or other crash preparation sequence or action, in response to determining that the object moving in zone L1 towards the vehicle. In more detail, and with reference to FIG. 29, when the rear driving and park assists mode is active based on the microprocessor 30 receiving a drive signal, the first radar detection sequence includes the step of 2908 activating the radar sensors in the side view mirror 94 and the radar sensors in the liftgate 22 to monitor all the detection zones, e.g. zones L1, L2, M1, M2, M3, M4, 2910 mixing a plurality of transmit signals from the plurality of radar transmit antennas 44 and a plurality of receive signals from the plurality of radar receive antennas 46. Next, 2912 generating an intermediate frequency signal. The first radar sequence continues by 2914 filtering the intermediate frequency signal with a bandpass filter and 2916 transforming the filtered intermediate frequency signal with a fast Fourier transform (FFT). The next step of the first radar sequence is 2818 performing a peak search and object range detection. The first radar sequence continues with the steps of 2920 determining whether the object is in zones L2 or M2, or M4 and 2921 continuing scanning and returning to the step of 2910 mixing the plurality of transmit signals from the plurality of radar transmit antennas 44 and the plurality of receive signals from the plurality of radar receive antennas 46 in response to the object not being in zones L2 or M2, or M4. The first radar sequence also includes 2926 enabling object tracking in response to the object being in zones L2 or M2, or M4 and 2928-1 enabling speed detection and 2928-2 location detection in response to enabling object tracking. The first radar sequence continues with the steps of 2930 determining if the object moving from zone L2 to L1, or M2 to M1, or M4 to M3, indicating it is approaching the vehicle. The first radar sequence also includes returning to the step of 2926 enabling object tracking in response to determining that the object is not moving from zone L2 to L1, or M2 to M1, or M4 to M3. The first radar sequence also includes 2932 monitoring zones L1, M1, and/or M3 in response to determining that the object is moving from zone L2 to L1, or M2 to M1, or M4 to M3. The first radar sequence continues with the steps of 2934 determining if the object moving in zones L1, M1, and/or M3 towards the vehicle, indicating it is continuing to approach the vehicle. The first radar sequence also includes returning to the step of 2932 monitoring zone L1, M1, and/or M3 in response to determining that the object is not moving from moving in zone L1, M1, and/or M3 towards the vehicle. The first radar sequence continues with the steps of 2936 warning the driver, in response to determining that the object is moving zone L1, M1, and/or M3 towards the vehicle.

Figure 30:
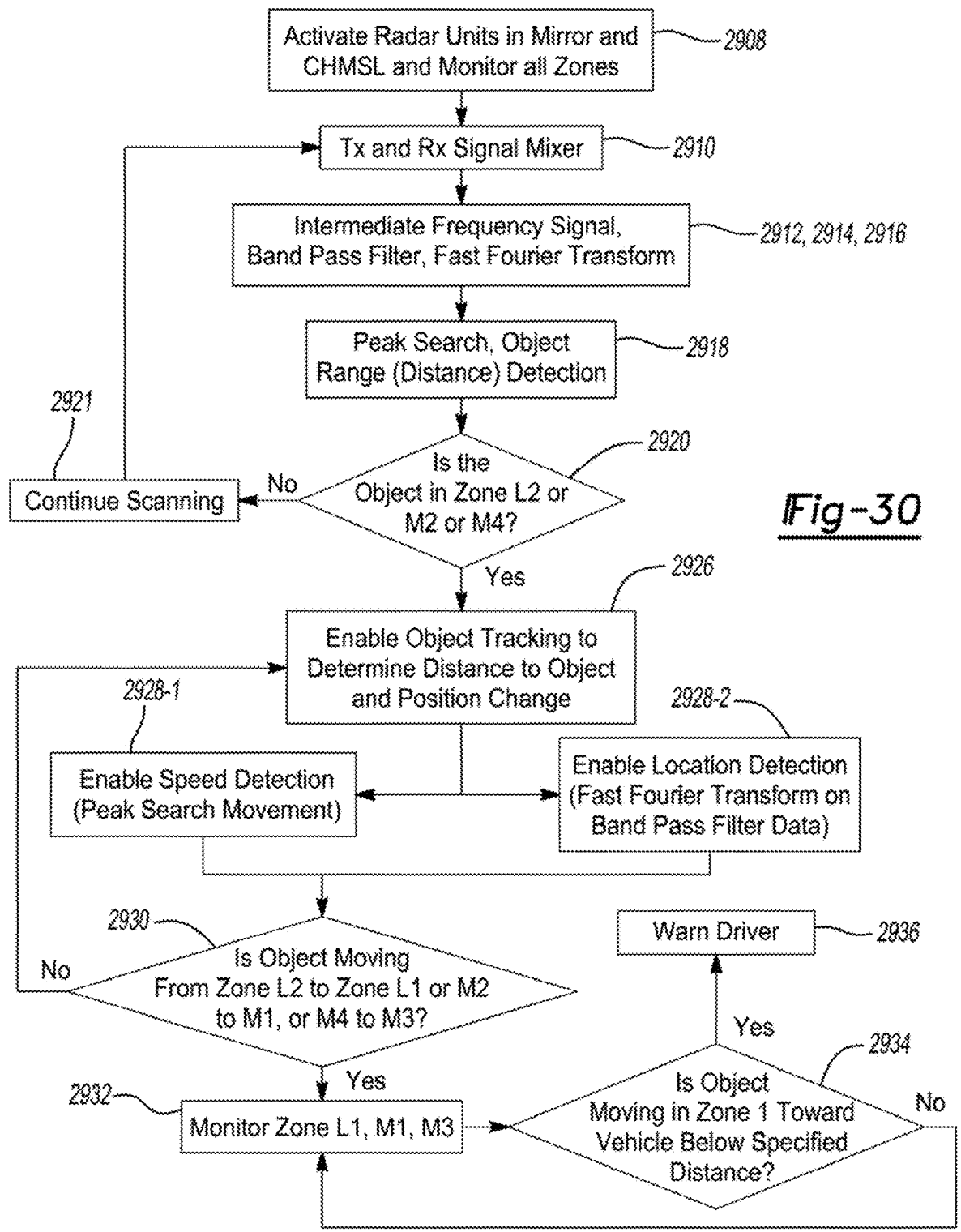
Figure 31:
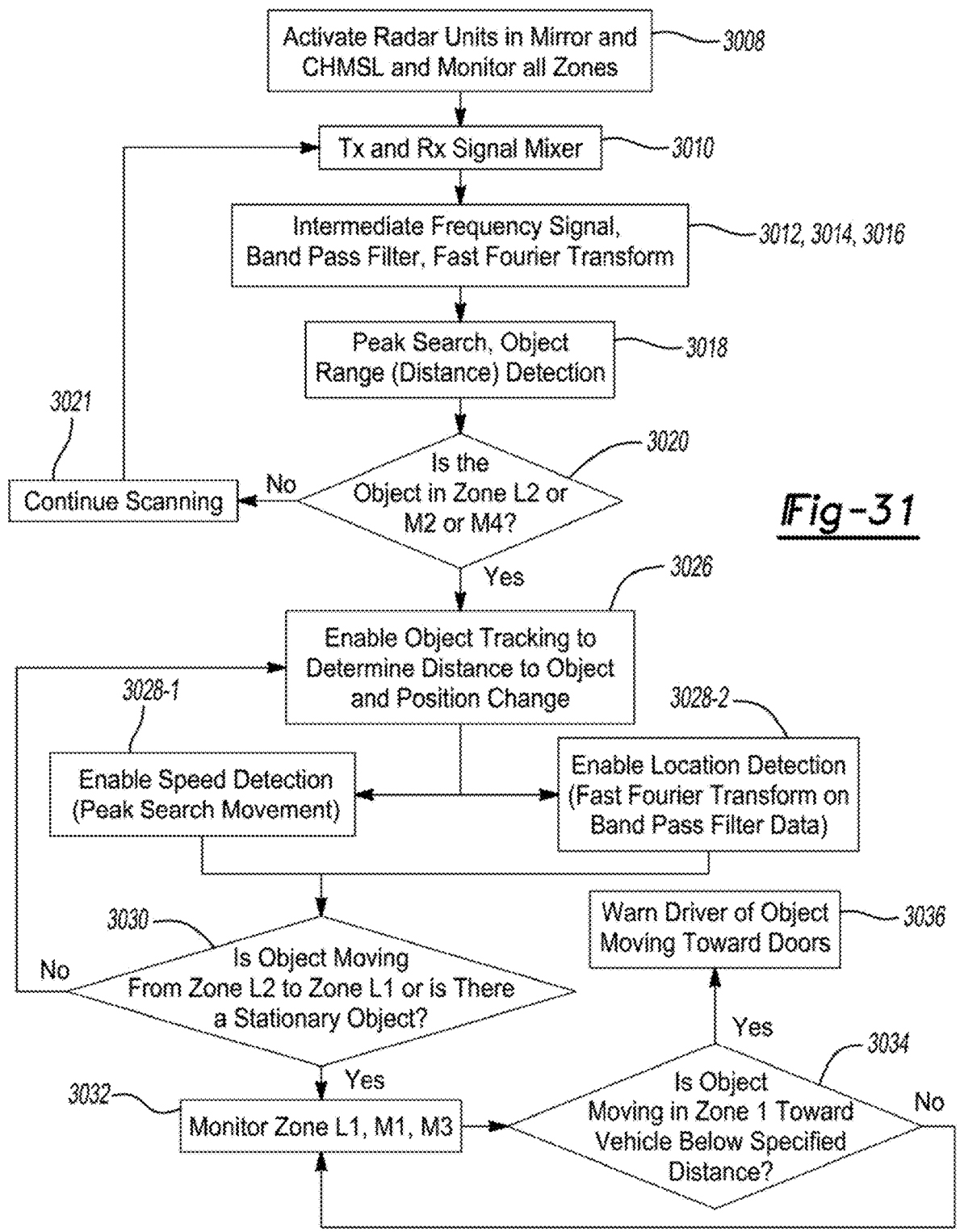

In more detail, and with reference to FIG. 30, when the park (e.g., ignition on or off, passengers in vehicle, gear shift in park) mode is active based on the microprocessor 30 receiving a drive signal, the first radar detection sequence includes the step of 3008 activating the radar sensors in the side view mirror 94 and the radar sensors in the liftgate 22 to monitor all the detection zones, e.g. zones L1, L2, M1, M2, M3, M4, 3010 mixing a plurality of transmit signals from the plurality of radar transmit antennas 44 and a plurality of receive signals from the plurality of radar receive antennas 46. Next, 3012 generating an intermediate frequency signal. The first radar sequence continues by 3014 filtering the intermediate frequency signal with a bandpass filter and 3016 transforming the filtered intermediate frequency signal with a fast Fourier transform (FFT). The next step of the first radar sequence is 3018 performing a peak search and object range detection. The first radar sequence continues with the steps of 3020 determining whether the object is in zones L2 or M2, or M4 and 3021 continuing scanning and returning to the step of 3010 mixing the plurality of transmit signals from the plurality of radar transmit antennas 44 and the plurality of receive signals from the plurality of radar receive antennas 46 in response to the object not being in zones L2 or M2, or M4. The first radar sequence also includes 3026 enabling object tracking in response to the object being in zones L2 or M2, or M4 and 3028-1 enabling speed detection and 3028-2 location detection in response to enabling object tracking. The first radar sequence continues with the steps of 3030 determining if the object moving from zone L2 to L1, or M2 to M1, or M4 to M3, or if the object is stationary. The first radar sequence also includes returning to the step of 3026 enabling object tracking in response to determining that the object is not moving from zone L2 to L1, or M2 to M1, or M4 to M3. The first radar sequence also includes 3032 monitoring zones L1, M1, and/or M3 in response to determining that the object is moving from zone L2 to L1, or M2 to M1, or M4 to M3. The first radar sequence continues with the steps of 2934 determining if the object moving in zones L1, M1, and/or M3 below a specified distance. The first radar sequence also includes returning to the step of 2932 monitoring zone L1, M1, and/or M3 in response to determining that the object is not moving from moving in zone L1, M1, and/or M3 towards the vehicle. The first radar sequence continues with the steps of 2036 warning the object, such as a pedestrian, cyclists or another vehicle, that the object is approaching the vehicle, such as the vehicle door, for example, using a visual (light) and/or audible (sound) alert.

Clearly, changes may be made to what is described and illustrated herein without, however, departing from the scope defined in the accompanying claims. The detection system disclosed may operate with any kind of different closure devices within the motor vehicle, for example.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with the example detection system can likewise be implemented into many other systems to control one or more operations and/or functions.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

What is claimed is:

1. A detection system for a closure panel of a vehicle, comprising:
    at least one sensor configured to transmit at least one detection beam for sensing at least one of an object and a motion adjacent the closure panel;
    wherein said at least one sensor is mounted to one side of the closure panel and adjacent an aperture provided on the closure panel, said at least one sensor for sensing the at least one of the object and the motion adjacent the one side and the other side of the closure panel by transmitting the at least one detection beam and receiving a reflection of the at least one detection beam through the aperture.

2. The detection system as set forth in claim 1, further comprising at least one additional sensor for sensing the at least one of the object and the motion adjacent and rearward of a side closure panel and outputting data corresponding to the at least one of the object and the motion adjacent and rearward to the vehicle.

3. The detection system as set forth in claim 2, wherein said at least one additional sensor is adapted to be disposed in a side rearview mirror mounted to the side closure panel.

4. The detection system as set forth in claim 2, wherein said at least one sensor and said at least one additional sensor are each configured to detect the at least one of the object and the motion within at least one detection zone based on the determination of which of the plurality of modes should be active.

5. The detection system as set forth in claim 4, wherein the at least one detection zone is delimited based on a predetermined distance and angle from said at least one sensor and said at least one additional sensor.

6. The detection system as set forth in claim 5, wherein said at least one sensor and said at least one additional sensor operate at a first power level for detecting the at least one of the object and the motion within a first detection zone when one of the plurality of modes is active, and operate at a second power level when detecting the at least one of the object and the motion within a second detection zone when another one of the plurality of modes is active, wherein the first power level is lower than the second power level and the first detection zone is smaller than the second detection zone.

7. The detection system as set forth in claim 5, wherein said at least one sensor and said at least one additional sensor operate at a second power level for detecting the at least one of the object and the motion within a second detection zone, and operate at a first power level for detecting the at least one of the object and the motion within a first detection zone closer to the vehicle than the second detection zone when detecting the at least one of the object and the motion has moved from the second detection zone towards the vehicle, wherein the first power level is lower than the second power level and the first detection zone is smaller than the second detection zone.

8. The detection system as set forth in claim 1, wherein said at least one sensor is configured for outputting data corresponding to the at least one of the object and the motion to a microprocessor;
    wherein said microprocessor is operable in a plurality of modes and is electrically coupled to at least one vehicle system controller and is further configured to determine which of the plurality of modes should be active based on communication with the at least one vehicle system controller, to receive and process data corresponding to the at least one of the object and the motion from said at least one sensor based on a determination of which of the plurality of modes should be active, and to initiate a vehicle function in response to processing the data corresponding to the at least one of the object and the motion.

9. The detection system as set forth in claim 8, wherein said at least one sensor each includes at least one radar transmit antenna for transmitting at least one radar beam outwardly therefrom and at least one radar receive antenna for receiving at least one radar beam from said at least one radar transmit antenna reflected from the object, said at least one radar transmit antenna and said at least one radar receive antenna disposed on a sensor printed circuit board.

10. The detection system as set forth in claim 9, wherein the closure panel is a liftgate and the aperture is a window.

11. The detection system as set forth in claim 10, further including a lighting subassembly including a lighting printed circuit board coupled to said sensor printed circuit board and electrically coupled to a power supply unit and said microprocessor for providing lighting associated with the closure panel.

12. The detection system as set forth in claim 11, wherein said lighting subassembly includes a plurality of light emitting diodes disposed on said lighting printed circuit board.

13. The detection system as set forth in claim 11, wherein said lighting subassembly is a center high mounted stop light disposed above the window.

14. The detection system as set forth in claim 10, wherein said sensor printed circuit board is in an overlapping configuration with the window.

15. The detection system as set forth in claim 8, wherein said plurality of modes includes at least one of a gesture recognition mode and a park assist mode and an outward obstacle detection mode and an inward obstacle detection mode and a crash detection mode and a blindspot monitoring mode.

16. A method of operating a detection system for a vehicle, the method comprising the steps of:
    operating at least one sensor mounted to and on one side of a closure panel to transmit and receive at least one detection beam through an aperture in the closure panel to detect at least one of an object and a motion on an other side of the closure panel; and
    controlling movement of the closure panel based on the detection of the at least one of the object and the motion on the other side of the closure panel.

17. The method as set forth in claim 16, wherein the step of operating the at least one sensor of the detection system to detect at least one of the object and the motion on the other side of the closure panel includes the step of
    entering an inward obstacle detection mode of the microprocessor in response to receiving a signal to close the closure panel when the closure panel is in an open position, and wherein the step of controlling movement of the closure panel based on the detection of the at least one object and the motion on the other side of the closure panel includes the steps of:
    controlling movement of the closure panel using a power actuator in the inward obstacle detection mode; and
    stopping movement of closure of the closure panel in response to determining whether the detection system detects the at least one of the object and the motion on the other side of the closure panel.

18. The method as set forth in claim 16, wherein the step of operating the at least one sensor of the detection system to detect the at least one of the object and the motion on the other side of the closure panel includes the step of entering a gesture detection mode of the microprocessor when the closure panel is in an open position, and wherein the step of controlling movement of the closure panel based on the detection of the motion as a gesture in the inward obstacle detection mode includes the steps of:

controlling movement of the closure panel using a power actuator in the gesture detection mode; and initiating movement of closure of the closure panel in response to determining whether the detection system detects the gesture on the other side of the closure panel.

19. The method as set forth in claim 16, further comprising operating the at least one sensor mounted to and on the one side of the closure panel to transmit and receive the at least one detection beam through the aperture in the closure panel to detect the at least one of the object and the motion on both an inboard and an outboard side of the closure panel.

20. A lighting assembly for a closure panel of a vehicle having at least one vehicle system controller, comprising:

a housing adapted to be mounted on one of an inboard side and an outboard side of the closure panel;

a light source housed within the housing for providing lighting associated with the closure panel;

at least one sensor housed in the housing for sensing at least one of an object and a motion adjacent both the inboard side and the outboard side of the closure panel and outputting data corresponding to the at least one of an object and a motion, said at least one sensor configured to transmit at least one detection beam through an aperture of the closure panel for sensing the at least one of the object and the motion on the other one of the inboard side and the outboard side of the closure panel; and a microprocessor electrically coupled to the at least one vehicle system controller and to said at least one sensor, and configured to operate the at least one sensor to sense the at least one of the object and the motion adjacent the outboard side and the inboard side of the closure panel and communicate with said at least one vehicle system controller to initiate a vehicle function in response to processing the data corresponding to the at least one of the object and the motion.

* * * * *